(12) United States Patent
Cruz et al.

(10) Patent No.: US 8,639,637 B2
(45) Date of Patent: Jan. 28, 2014

(54) INTELLIGENT CONTROL TOOLKIT

(75) Inventors: Pedro Ponce Cruz, Mexico City (MX); Fernando David Ramirez Figueroa, Mexico City (MX); Hiram Eredin Ponce Espinosa, Mexico City (MX)

(73) Assignee: Tecnologico de Monterrey, Tlalpan (MX)

( * ) Notice: Subject to any disclaimer, the term of this patent is extended or adjusted under 35 U.S.C. 154(b) by 855 days.

(21) Appl. No.: 12/607,887

(22) Filed: Oct. 28, 2009

(65) Prior Publication Data

US 2010/0138364 A1    Jun. 3, 2010

Related U.S. Application Data

(60) Provisional application No. 61/197,484, filed on Oct. 28, 2008.

(51) Int. Cl.
*G06E 1/00*      (2006.01)
*G06E 3/00*      (2006.01)
*G06F 15/00*    (2006.01)
*G06G 7/00*     (2006.01)
*G06F 15/18*    (2006.01)

(52) U.S. Cl.
USPC ............ 706/10; 706/6; 706/8; 706/13; 901/1

(58) Field of Classification Search
USPC ........................ 706/2, 6, 12–15, 8, 10; 901/1
See application file for complete search history.

(56) References Cited

U.S. PATENT DOCUMENTS 5,740,323 A * 4/1998 Nomura et al. .................... 706/8
6,381,591 B1 * 4/2002 Hoffmann et al. ................. 706/2
6,456,990 B1 * 9/2002 Hoffmann et al. ................. 706/2
2003/0102373 A1 * 6/2003 Swartz et al. .................. 235/383
2009/0077418 A1 * 3/2009 Navarro et al. ................... 714/16
2009/0276391 A1 * 11/2009 Kofman et al. ................... 706/59

OTHER PUBLICATIONS

Ponce, P. et al. "Neuro-Fuzzy Controller Using Labview", Proceedings of the 10th IASTED International Conference Intelligent Systems and Control, Nov. 19-21, 2007. ISBN: 978-0-88986-707-9. pp. 487-493.*
Hoffmann, F. et al. "Genetic programming for model selection of TSK-fuzzy systems". Information Sciences 136. 2001. pp. 7-28.*
Ponce-Cruz, P. et al. "A Novel Neuro-Fuzzy Controller Based on Both Trigonometric Series and Fuzzy Clusters". IEEE. 2006. pp. 407-412.*
Govindasamy, K. et al. "Fuzzy System with Increased Accuracy Suitable for FPGA Implementation". International Conference on Intelligent Engineering Systems, INES2008. Feb. 25-29, 2008. pp. 133-138.*

(Continued)

*Primary Examiner* — Jeffrey A Gaffin
*Assistant Examiner* — Benjamin Buss
(74) *Attorney, Agent, or Firm* — McAndrews, Held & Malloy Ltd.

(57) ABSTRACT

A neuro-fuzzy controller is provided. The neuro-fuzzy controller includes a predictor that receives inputs and makes prediction inputs. The prediction inputs are passed to a fuzzy cluster module that includes a neural network fuzzifing said prediction inputs and passing the result to an inference engine. The output of the inference engine is defuzzified and provided as an output of the controller. The fuzzifier and defuzzifier preferably represent a neural network employing a trigonometrical series. The inference engine preferably employs rules that are determined using genetic programming.

5 Claims, 27 Drawing Sheets

(56) References Cited

OTHER PUBLICATIONS

Ponce, P. et al. "A Novel Neuro-Fuzzy Controller Genetically Enhanced Using LabVIEW". IEEE. Nov. 2008. pp. 1559-1565.*

Jerome, J. et al. "LabVIEW based Intelligent Controllers for Speed Regulation of Electric Motor". IMTC2005—Instrumentation and Measurement Technology Conference. May 17-19, 2005. IEEE. pp. 935-940.*

Vassilopoulos, A.P. et al. "Adaptive neuro-fuzzy inference system in modelling fatigue life of multidirectional composite laminates", Computational Materials Science, vol. 43, Issue 4, Oct. 2008, pp. 1086-1093. http://dx.doi.org/10.1016/j.commatsci.2008.02.028.*

Toosi, A.N. et al. "A new approach to intrusion detection based on an evolutionary soft computing model using neuro-fuzzy classifiers", Computer Communications, vol. 30, Issue 10, Jul. 31, 2007, pp. 2201-2212. http://dx.doi.org/10.1016/j.comcom.2007.05.002.*

Rummel, C. "Quantification of intra- and inter-cluster relations in nonstationary and noisy data". Phys. Rev. E vol. 77, Issue 1, 016708, The American Physical Society. Jan. 17, 2008. DOI:10.1103/PhysRevE.77.016708.*

* cited by examiner

2600

INTELLIGENT CONTROL TOOLKIT

CROSS-REFERENCE TO RELATED APPLICATIONS

The present application claims the benefit of U.S. Provisional Application No. 61/197,484, filed Oct. 28, 2008, entitled "Intelligent Control Toolkit For LabVIEW." which is hereby incorporated by reference in its entirety.

BACKGROUND OF THE INVENTION

The present invention generally relates to a control system. More particularly, the present invention relates to a control system employing a predictor, fuzzification, a neural network, and genetic programming.

Control systems have been used for controlling processes for decades. However, prior art control systems typically suffer from at least one of several drawbacks.

First, although there are a number of prior art control systems that employ systems such as neural networks and fuzzy logic to make decisions, such systems typically require substantial training using known sets of data.

Second, such prior art system are typically very complex and require an expert to tune and establish the system.

Third, prior art systems typically rely on one of the several available methodologies of decision making and are not able to combine decision making methodologies to provide improved performance.

BRIEF SUMMARY OF THE INVENTION

One or more of the embodiments of the present invention provide a neuro-fuzzy controller including a predictor that receives inputs and makes prediction inputs. The prediction inputs are passed to a fuzzy cluster module that includes a neural network fuzzifing said prediction inputs and passing the result to an inference engine. The output of the inference engine is defuzzified and provided as an output of the controller. The fuzzifier and defuzzifier preferably represent a neural network employing a trigonometrical series. The inference engine preferably employs rules that are determined using genetic programming, in this form to find directly rules that may be defined in a short period of time without the help of an expert. This embodiment allows the user to tune the complete controller in a better way. Additionally, the controller may also be autonomous.

DETAILED DESCRIPTION OF THE INVENTION

Figure 1:
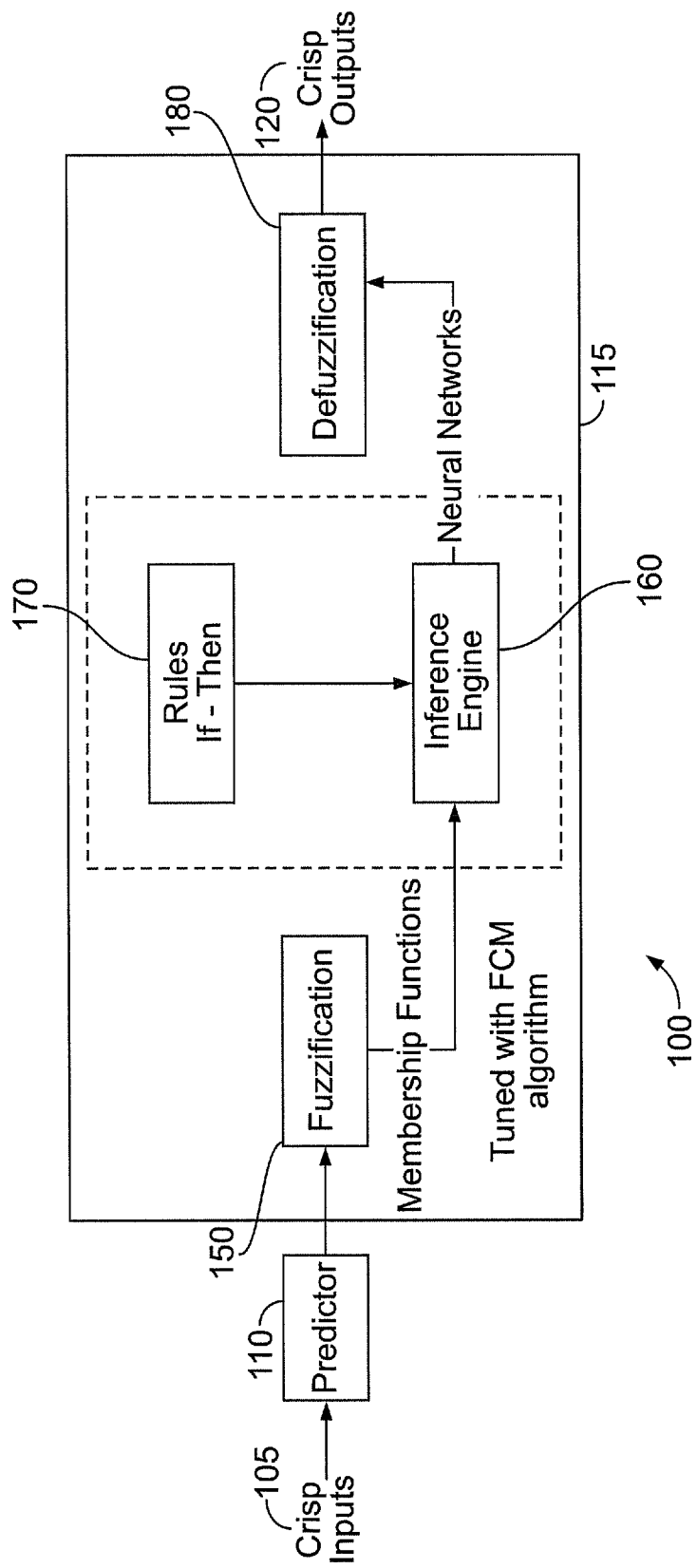
FIG. 1 illustrates a neuro-controller according to an embodiment of the present invention.

FIG. 1 illustrates a neuro-controller 100 according to an embodiment of the present invention. The neuro-controller 100 includes inputs 105, a predictor 110, a fuzzy cluster module (FCM) 115, and outputs 120. The FCM 115 includes a fuzzification system 150, an inference engine 160, a set of If-then rules 170, and a defuzzification system 180.

The neuro-controller 100 is preferably based on trigonometric neural networks, predictor, partition coefficients and the FCM. The neuro-controller 100 preferably follows a modified Takagi-Sugeno structure but instead of using polynomials on the defuzzification process it also uses trigonometric neural networks (T-ANN's) and the process for tuning the membership functions is based on FCM.

Initially the number of membership functions is preferably calculated using Partition Coefficients. This method provides for an improved number of membership functions.

As shown in FIG. 1, crisp inputs 105 are provided to the predictor 110. The output of the predictor 110 is then supplied to the fuzzification system 150. The output of the fuzzification system 150 is then supplied to the inference engine 160, which receives rules from the If-then rules set 170. The output of the inference engine is then supplied to the defuzzification system 180, which in turn provides the crisp outputs 120.

One of the concerns in using the FCM is to find the number of clusters. However, this is addressed by the Partition Coefficient—this is the first stages in the controller after that the diagram showed in FIG. 1 is used.

The information below presents the analytical information regarding the stages of the controller 100.

First, the Partition Coefficient (PC) is a method used to validate how well a clustering algorithm has identified the structure presented in data that is represented into clusters. This small algorithm is based on the following equation:

$$PC(U;c) = \frac{\sum_{j=1}^{n}\sum_{i=1}^{c}(u_{ij})^2}{n}$$

Where U is the partition matrix and $u_{ij}$ is the membership value of the j-th element of the data related to the i-th cluster, c is the number of clusters and n is the number of elements in data collection. From this equation, it may be noted that the closer the PC is to 1, the better the data is considered to be classified.

The preferred number of clusters may be denoted at each c by $\Omega_c$ using:

$$\max_{c}\left[\max_{\Omega_c \in U}\{PC(U;c)\}\right]$$

The Table below shows the above procedure.

TABLE 1

| Method | Partition Coefficient |
|---|---|
| Step 1 | Initialize c = 2. Run FCM or any other clustering algorithm. |
| Step 2 | Calculate the partition coefficient. |
| Step 3 | Update the value of clusters c = c + 1. |
| Step 4 | Run until no variations at PC are found and obtain the optimal value of clusters. |
| Step 5 | Return the optimal value c and STOP. |

Figure 2:
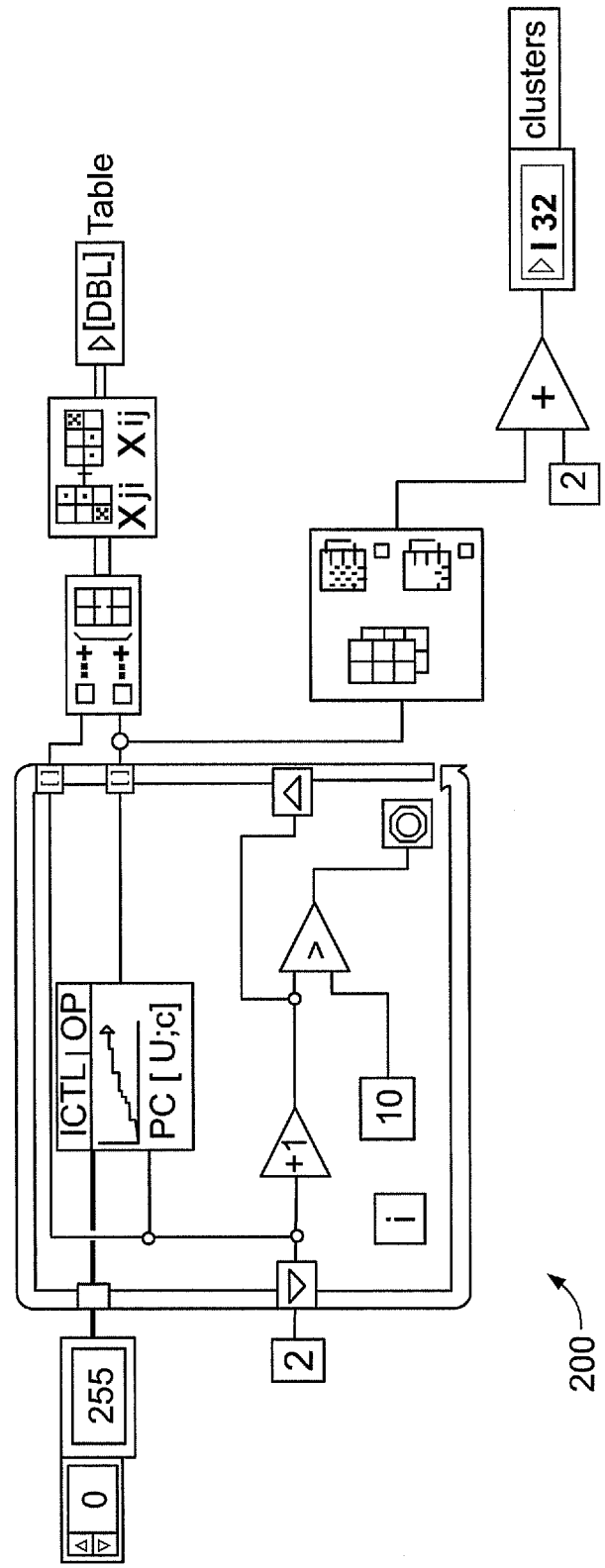
FIG. 2 illustrates a block diagram for finding the preferred number of clusters using the Partition Coefficient, as described above.

FIG. 2 illustrates a block diagram 200 for finding the preferred number of clusters using the Partition Coefficient, as described above.

Trigonometric Artificial Neural Networks

Consider $f(x)$ periodic and integrable in Lesbegue (continuous and periodic functions ($2\pi$) in $[-\pi,\pi]$ or $[0, 2\pi]$). In Mathematics, the Lesbegue measure is the standard form to assign a longitude, area, or volume to the subsets of the Euclidean space. It must be written as $f \in C^*[-\pi,\pi]$ or just $f \in C^*$. Being that the Fourier series are associated to $f$ in the point x are given by:

$$f(x): \frac{a_0}{2} + \sum_{n=1}^{\infty}(a_n\cos(nx) + b_n\sin(nx)) = \sum_{k=1}^{\infty} A_k(x)$$

The deviation—error—of $f \in C^*$ from the Fourier series at the x point or from a trigonometric polynomial of order $\leq n$.

$$E_n(f) = \min_{\tau_n}$$

$$\max_{0 \leq x \leq 2\pi}|f(x) - \tau_n(x)| = \min_{\tau_n}\|f - \tau_n\|$$

Using Favard sums of $f$ falling in its extreme basic property, give the best approximation for trigonometric polynomials of a class (periodic continuous functions) as follows:

$$\|f'\| = \max_{x}|f'(x)| \leq 1$$

Theorem: If $f \in C[a,b]$ and $\tau_n = P_n$ is polynomial of degree $\delta \leq n$ then:

$$\lim_{n \to \infty} E_n(f) = 0$$

Using a sumability method being:

$$M = \begin{pmatrix} a_{00} & a_{01} & L & a_{0n} & L \\ a_{10} & a_{11} & & a_{1n} & L \\ M & M & O & M & \\ a_{n0} & a_{n1} & & a_{nn} & L \\ M & M & & M & \end{pmatrix}$$

Where: M is a double matrix of infinite numbers.

For each $\{S_n\}$ sequence the $\{\sigma_n\}$ sequence is associated so:

$$\sigma_n = \sum_{v=0}^{\infty} a_{nv}S_v, n = 0, 1, 2, K$$

Where the series converge for all n if:

$$\lim_{n \to \infty} \sigma_n = s.$$

We then say that the sequence $\{S_n\}$ is sumable in M to the limit S. The $\sigma_n$ are named linear media of $\{S_n\}$. The equation system $\sigma_n = U\Sigma a_{nv}S_v$ may be written as: $\sigma = T(S)$ and call the system a linear transformation. $\sigma_n$ is also named the transformation of $S_n$ for T. The most important transformations are regulars.

If y(t) is a function in time (a measured signal) and x ($\omega$,t) is an approximated function (or rebuilt signal) that continuously depends of the vector $\omega \in \Omega$ and of time t. Then the problem of decomposition is to find the optimal parameters $\omega^* = [\omega_1^*, \omega_2^*, K, \omega_n^*]$ of the approximated function:

$$x(\omega, t) = \sum_{i=1}^{N} \omega_i \Phi_i$$

Where: $\{\Phi_i(t)\}(i=1, 2, K, N)$ is a set of basic specific functions. Orthogonal functions are commonly used as basic functions. An important advantage of using orthogonal functions is that when an approximation needs to be improved by increasing the number of basic functions, the $\omega_i$ coefficients of the original basic functions remain unchanged. Furthermore the decomposition of the signal of time in a set of orthogonal functions that are easily generated and defined has many applications on engineering.

Fourier series have been proven to be able to model any periodical signal. For any given signal $f(x)$ it is said to be periodic if $f(x)=f(x+T)$ where T is the fundamental period of the signal. The signal may be modeled using Fourier series:

$$f(x): \frac{a_0}{2} + \sum_{n=1}^{\infty}(a_n\cos(nx) + b_n\sin(nx)) = \sum_{n=1}^{\infty} A_k(x)$$

$$a_0 = \frac{1}{T}\int_0^T f(x)dx$$

$$a_n = \frac{1}{T}\int_0^T f(x)\cos(n\omega x)dx$$

$$b_n = \frac{1}{T}\int_0^T f(x)\sin(n\omega x)dx$$

The trigonometric Fourier series includes the sum of functions multiplied by a coefficient plus a constant, so a neural network may be built based on the previous equations.

Figure 3:
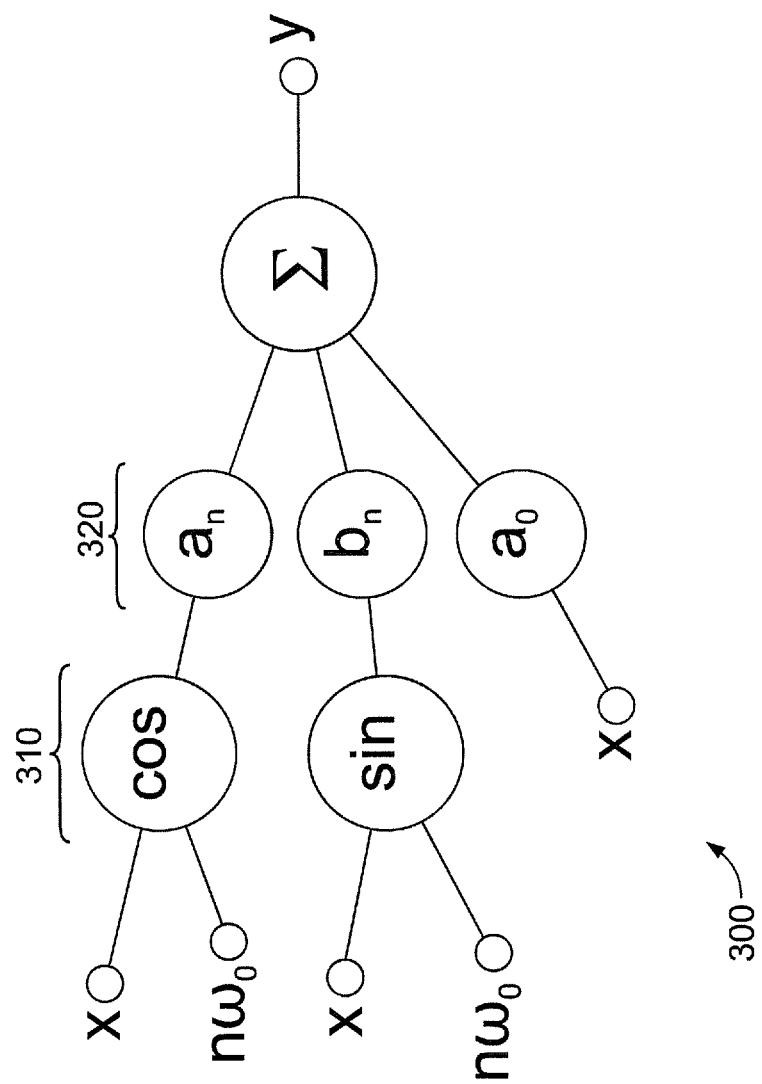
FIG. 3 illustrates the topology of a preferred embodiment of a neural network which is composed of two layers—a first layer and a second layer.

FIG. 3 illustrates the topology of a preferred embodiment of a neural network 300 which is composed of two layers—a first layer 310 and a second layer 320. On the first layer 310, the activation function of the neurons are trigonometric functions. On the second layer 320 the results of the activation functions multiplied by its weights plus a constant are summed. This constant is the mean value of the function; the weights are the coefficients of the Fourier trigonometric series.

One advantages of this topology is that the weights of the network may be computed using analytical methods as a linear equation system. The error on the solution decreases when the number of neurons is augmented which corresponds to adding more harmonics according to the Fourier series.

To train the network we need to know the available inputs and outputs. The traditional faun to train a network is to assign random values to the weights and then wait for the function to converge using the gradient descendent method. Using this topology the network is trained using the least squares method fixing a finite number of neurons and arranging the system in a matrix form Ax=B. Approximating the function with pair functions we will use cosines, if we want to do it with impair functions we will use sine.

Considering the sum of squared differences between the values of the output function, and the ones given by the function $f(x, a_0, K a_n)$ in the corresponding points, we will choose the parameters $a_0, K a_n$ such that the sum will have the minimum value:

$$S(a_0, Ka_n) = \sum_{i=1}^{m}[y_i - f(x, a_0, Ka_n)]^2 = \min$$

Using cosines:

$$S(a_0, Ka_n) = \sum_{i=1}^{m}\left[y_i - \left(1/2a_0 + \sum_{k=1}^{\infty} a_k\cos(k\omega_0 x)\right)\right]^2 = \min$$

This way the problem is reduced to find the parameters $a_0, K a_n$ for which $S(a_0, K a_n)$ has a minimum:

$$\frac{\partial S}{\partial a_0} - \frac{1}{2}\sum_{i=1}^{m}\left[y_i - \left(1/2a_0 + \sum_{k=1}^{\infty} a_k\cos(k\omega_0 x)\right)\right] = 0$$

-continued $$\frac{\partial S}{\partial a_p}\sum_{i=1}^{m}\left[y_i - \left(1/2a_0 + \sum_{k=1}^{\infty} a_k\cos(k\omega_0 x)\right)(n\omega_0 x)\right] = 0$$

for $p \geq 1$

This equation system may be the written in the matrix form Ax=B:

$$\begin{bmatrix} \frac{1}{2}m & L & \sum_{i=1}^{m}\cos(p\omega x_i) \\ \frac{1}{2}\sum_{i=1}^{m}\cos(p\omega_0 x_i) & L & \sum_{i=1}^{m}\cos(\omega_0 x_i)\cos(p\omega x_i) \\ M & O & \sum_{i=1}^{m}\cos(\omega_0 x_i)\cos(p\omega x_i) \\ \frac{1}{2}\sum_{i=1}^{m}\cos(p\omega_0 x_i) & L & \sum_{i=1}^{m}\cos^2(p\omega_0 x_i) \end{bmatrix}$$

$$\begin{bmatrix} a_0 \\ a_1 \\ M \\ a_n \end{bmatrix} = \begin{bmatrix} \sum_{i=1}^{m} y_i \\ \sum_{i=1}^{m} y_i\cos(\omega_0 x_i) \\ M \\ \sum_{i=1}^{m} y_i\cos(p\omega_0 x_i) \end{bmatrix}$$

Figure 4:
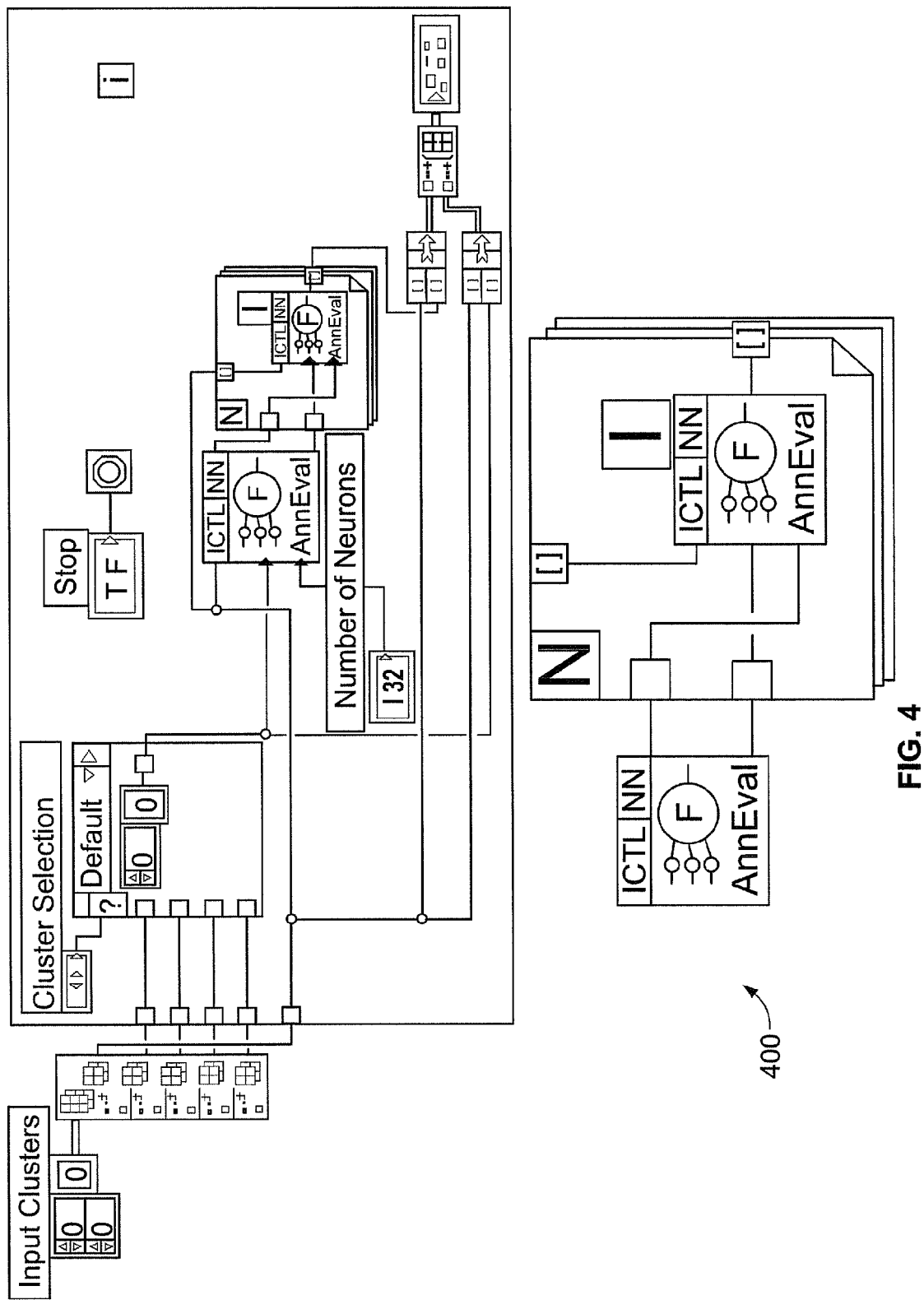
FIG. 4 illustrates the front panel and block diagram of a T-ANN example.

FIG. 4 illustrates the front panel and block diagram 400 of a T-ANN example.

Figure 5:
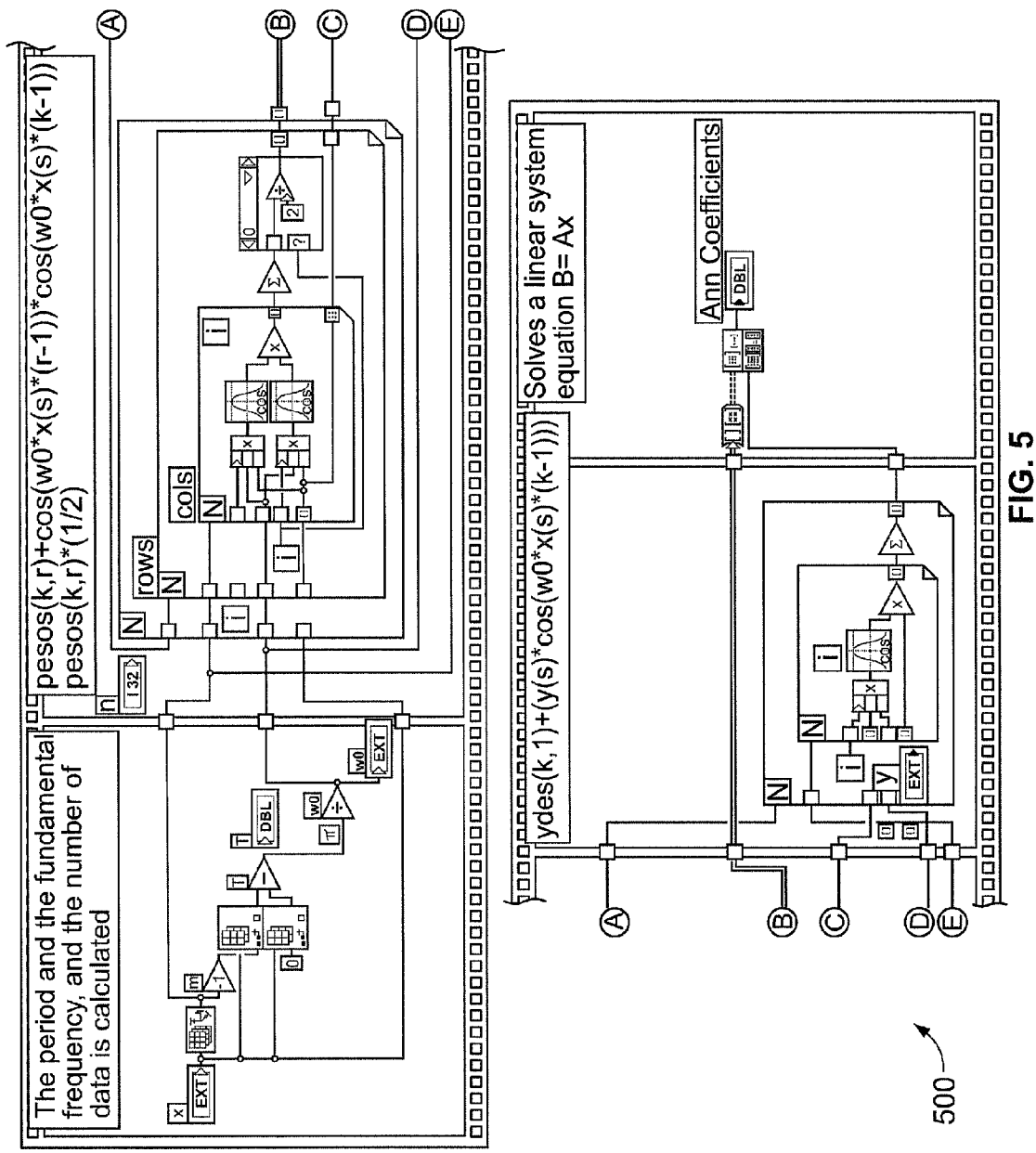
FIG. 5 illustrates the code that trains the neural network, for example as described in the method set forth above.

FIG. 5 illustrates the code that trains the neural network, for example as described in the method set forth above. This is a block diagram of T-ANN's trainer.

Fuzzy Cluster Module (FCM)

Clustering methods split a set of N elements $X=\{x_1, x_2 K, x_n\}$ into a c group denoted $c=\{\mu^1, \mu^2, K \mu^n\}$. Traditional clustering sets methods assume that each data vector may belong to one and only one class, but in practice clusters normally overlap, and some data vectors may belong partially to several clusters. Fuzzy set theory provides a natural way to describe this situation by FCM.

The fuzzy partition matrices M, for c classes and N data points were defined by three conditions: $M=\{U\epsilon V_{cN}|1,2,3\}$ The first condition: $\forall\ 1\leq i\leq c\ \mu_{ik}\epsilon[0,1],\ 1\leq k\leq N$ The second condition:

$$\sum_{k=1}^{c}\mu_{ik} = 1\ \ \forall\ \ 1 \leq k \leq N$$

The third condition:

$$\forall\ \ 1\leq i\leq c\ \ 0 < \sum_{k=1}^{c}\mu_{ik} < N$$

The FCM optimum criteria function has the following form:

$$J_m(U, V) = \sum_{i=1}^{c}\sum_{k=1}^{N}\mu_{ik}^m d_{ik}^2$$

Where $d_{ik}$ is an inner product noun defined as: $d_{ik}^2=\|x_k-v_i\|_A^2$

Where A is a positive definite matrix, m is the weighting exponent m∈[1, ∞). If m and c parameters are fixed and define sets then (U,V) may be globally minimal for Jm(U,V) only if:

$$\begin{array}{c} \forall \\ 1 \leq i \leq c \\ 1 \leq k \leq N \end{array} \quad u_{ik} = \frac{1}{\sum_{j=1}^{c}\left(\frac{\|x_k - v_i\|}{\|x_k - v_j\|}\right)^{\frac{2}{m-1}}} \quad (1)$$

$$\begin{array}{c} \forall \\ 1 \leq i \leq c \end{array} \quad v_j = \frac{\sum_{k=1}^{N}(u_{ik})^m x_k}{\sum_{k=1}^{N}(u_{ik})^m} \quad (2)$$

FCM Method

The fuzzy c-module solution may be described as:
1) Fix c and m, set p=0 and initialize $U^{(0)}$.
2) Calculate fuzzy centers for each cluster $V^{(p)}$ using (2).
3) Update fuzzy partition matrix $U^{(p)}$ for the p-th iteration using (1).
4) If $\|U^{(p)} - U^{(p-1)}\| < \epsilon$ then, j←j+1 and return to the second step.

In this algorithm, the parameter m determines the fuzziness of the clusters; if m is large the cluster is fuzzier. For m→1 FCM solution becomes the crisp one, and for m→∞ the solution is as fuzzy as possible. There is no theoretical reference for the selection of m, and usually m=2 is chosen. After the shape of the membership functions are fixed, the T-ANN's learn each one of them.

Predictive Method

The controller response may be improved by using predictors, which provide future information and allow it to response in advance. One of the simplest yet powerful predictors is based on exponential smoothing. A popular approach used is the Holt's method.

Exponential smoothing is computationally simple and fast at the same time this method may perform well in comparison with other more complex methods. The series used for prediction is considered as a composition of more than one structural component (average and trend) each of which may be individually modeled. We will use series without seasonality in the predictor. Such type of series may be expressed as:

$$y(x) = y_{av}(x) + p y_{tr}(x) + e(x); p=0$$

Where: y(x), $y_{av}(x)$, $y_{tr}(x)$, and e(x) are the data, the average, the trend and the error components individually modeled using exponential smoothing. The p-step ahead prediction is given by:

$$y^*(x+p|k) = y_{av}(x) + p y_{tr}(x)$$

The average and the trend components are modeled as:

$$y_{av}(x) = (1-\alpha)y(x) + (y_{av}(x-1) + y_{tr}(k-1))$$

$$y_{tr}(x) = (1-\beta)y_{tr}(x-1) + \beta(y_{av}(x) + y_{av}(x-1))$$

Where $y_{av}(x)$ and $y_{tr}(x)$ are the average and the trend components of the signal. Where α and β are the smoothing coefficients, its values range (0,1). $y_{av}$ and $y_{tr}$ may be initialized as:

$$y_{av}(1) = y(1)$$

$$y_{tr}(1) = \frac{(y(1) - y(0)) + (y(2) - y(1))}{2}$$

Figure 6:
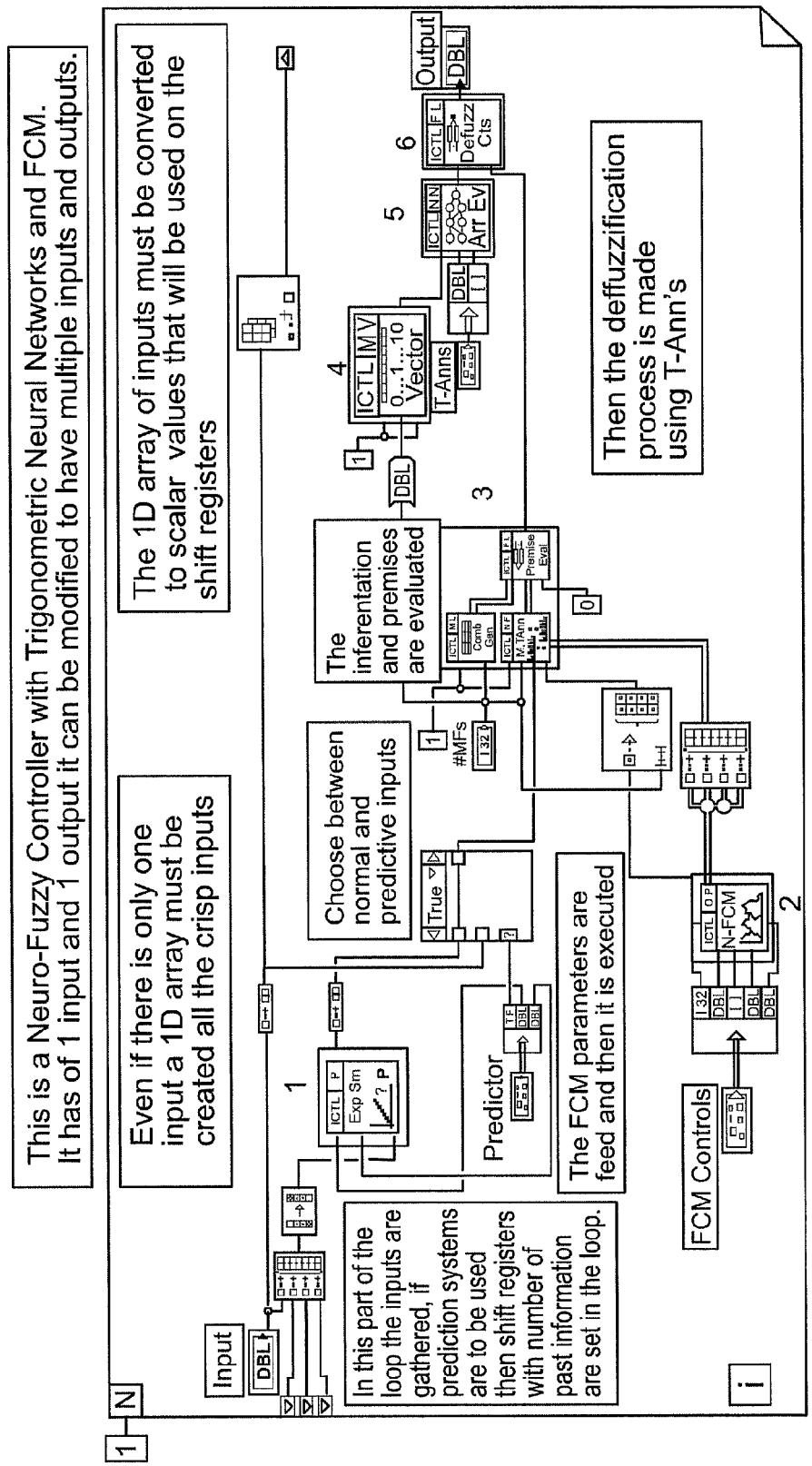
FIG. 6 is a block diagram of the neuro-fuzzy controller with one input and one output.

FIG. 6 is a block diagram of the neuro-fuzzy controller with one input and one output.

The execution of the controller depends on several VI's which are explained in the following steps:

1) This is a predictor VI based on exponential smoothing, the coefficients alpha and beta are fed as scalar values. The past and present information are fed in a 1D array with the newest information in the last element of the array.

2) The partition coefficient is executed for getting the number of membership functions.

3) This VI executes the FCM method, the information of the crisp inputs are fed as well as stop conditions for the cycle, the program returns the coefficients of the trigonometric networks, the fundamental frequency and other useful information.

4) These three VI's execute the evaluation of the premises. The first on the top left generator of the combinations of rules, that depends on the number of inputs and membership functions. The second one on the bottom left combines and evaluates the input membership functions. The last one on the right uses the information on the combinations as well as the evaluated membership functions to obtain the premises of the IF-THEN rules.

5) This VI creates a 1D array with the number of rules of the system: {1,2,K,n} where n is the number of rules, it is used on the defuzzification process.

6) This VI evaluates a T-ANN on each of the rules.

7) This VI defuzzifies using the Takagi method with the obtained crisp outputs from the T-ANN.

Figure 7:
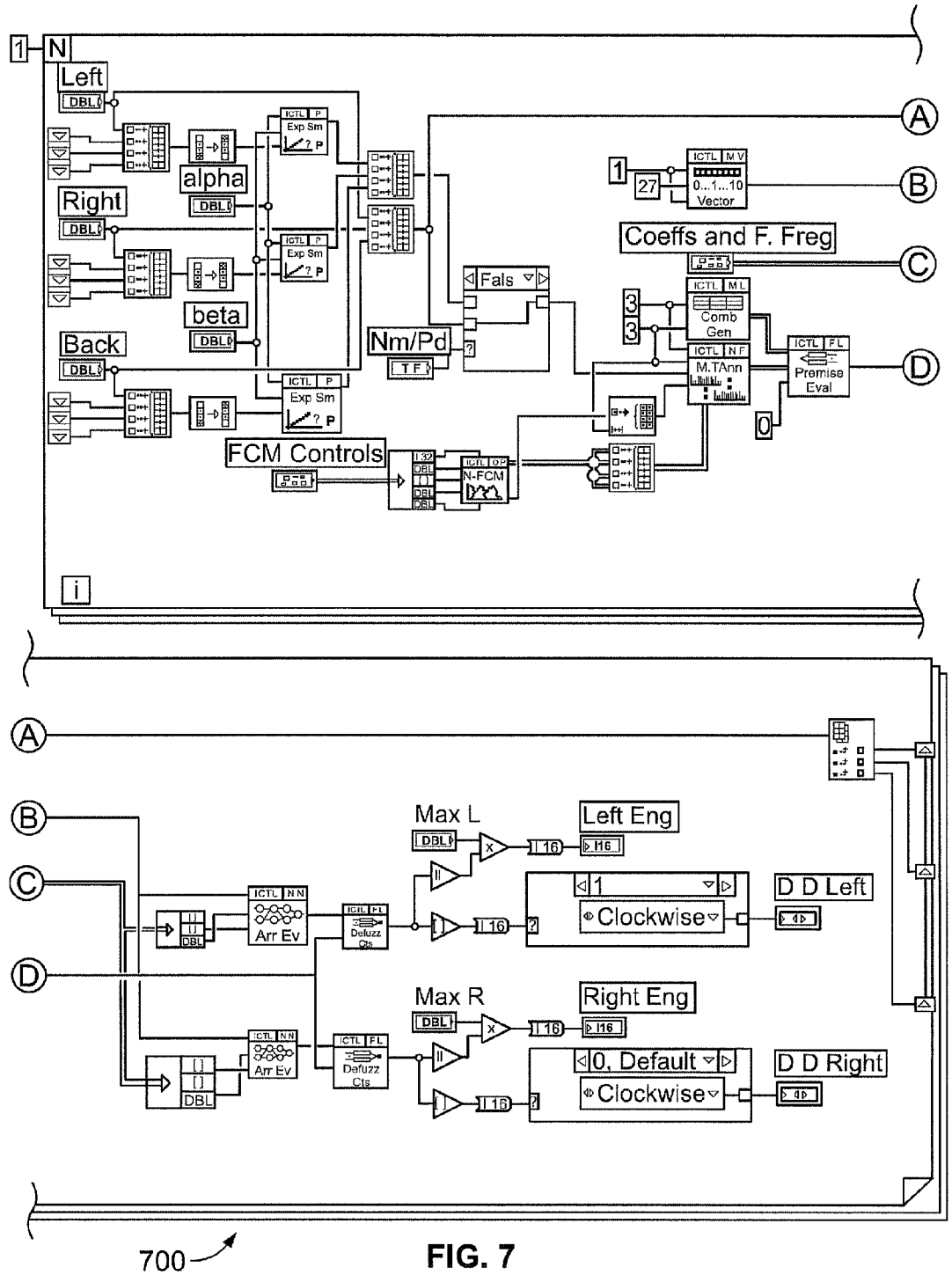
FIG. 7 illustrates a block diagram of an alternative embodiment having three inputs and four outputs.

This version of one input one output of the controller is modifiable to adapt to different systems. For example, FIG. 7 illustrates a block diagram 700 of an alternative embodiment having three inputs and four outputs.

Example Robotic System

The following example was designed for a real application of the neuro controller. For the designing process all the steps of the controller where used. The following paragraphs describe in detail the application. The first stage in the controller design was to applied the partition coefficient method.

For the design of the prototype, a quadruped mobile robot QuadCrawler, a commercial structure of robot, is used this robot is built on a light aluminum chassis that allows loads up to 2.26 kilograms, 8 actuators are provided for its displacement to get two degrees of freedom per leg. A Basic Stamp microcontroller and a PSC Power Source Controller for control and provision of necessary power for the actuators is provided with the kit. Three PING))) ultrasonic sensors are used for detecting the obstacle's distance. These sensors have a distance detection range from 3 cm to 3 m, and a detection angle of 40 degrees. The digital signal processor DSP 56F801 is used transmit the command from LabVIEW to the Basic Stamp microprocessor. The 56800 architecture of the family is Harvard based, allowing up to six operations per cycle of instruction 40 MIPS at 80 MHz. The 50F801 DSP and a computer with LabVIEW were used to implement the neuro-fuzzy controller. For communications between the computer and the robot, wireless serial communication was used, with devices that support Bluetooth technology. In the robot the EmbeddedBlue transceiver was used to provide the Basic Stamp standard Bluetooth connectivity. The computer used a Bluetooth USB adapter F8T001 to provide it with a Bluetooth communications interface.

Eight rechargeable batteries from 1.2 volts and AA size are used to create a 9 volts dc power supply for the Basic Stamp and the DSP while six from these batteries a 7.2 volts dc supply is used in the servos.

The program was implemented by LabVIEW and the DSP was relegated to the control movement of the robot to manage different walking types.

Figure 8:
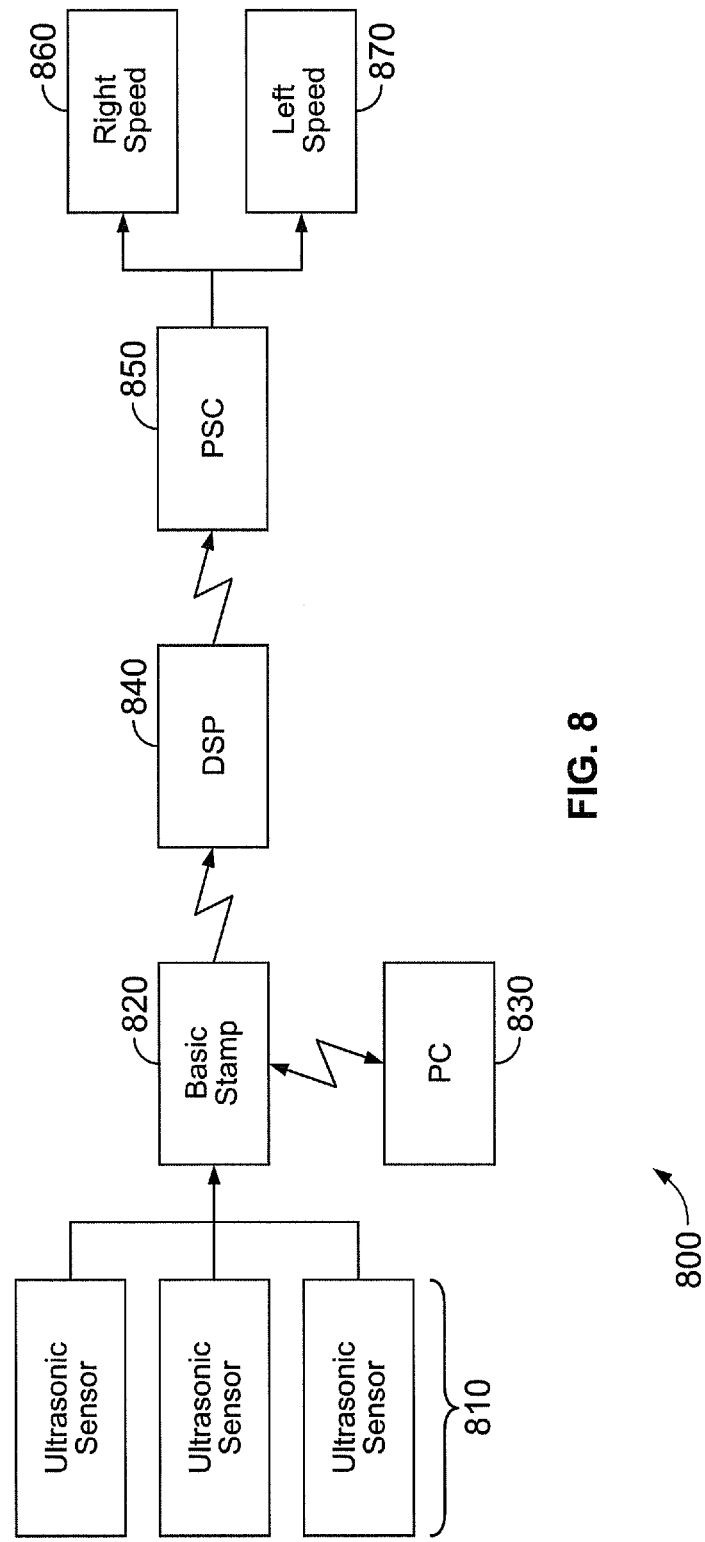
FIG. 8 illustrates a block diagram of the components of the present robotic system exemplary embodiment.

FIG. 8 illustrates a block diagram 800 of the components of the present robotic system exemplary embodiment. As shown in FIG. 800, the robotic system 800 includes ultrasonic sensors 810, a basic stamp 820 in communication with a PC/computer 830, a digital signal processor (DSP) 840, and a PSC card 850 that controls right speed 860 and left speed 870.

The computer communicates bidirectionally, as shown in FIG. 8, with the Basic Stamp through the Bluetooth devices, preferably all the processing is done and the speeds are sent back to the Basic Stamp that sends that information to the DSP to execute the walking sequences which communicates the PSC card to control the actuators.

Figure 9:
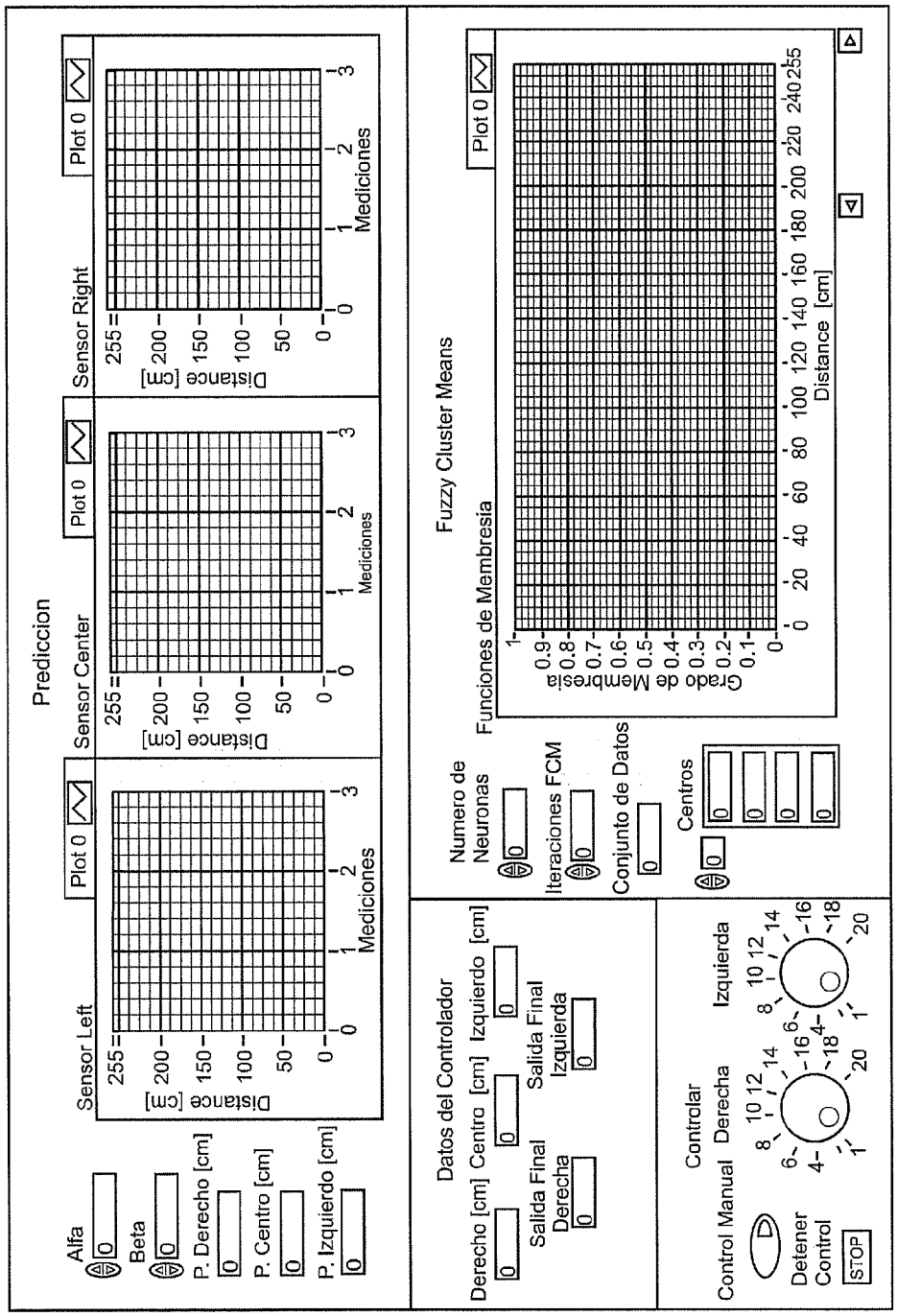
FIG. 9 illustrates the general panel of the man-machine interface/graphical user interface as implemented in LabVIEW.

FIG. 9 illustrates the general panel 900 of the man-machine interface/graphical user interface as implemented in LabVIEW.

Figure 10:
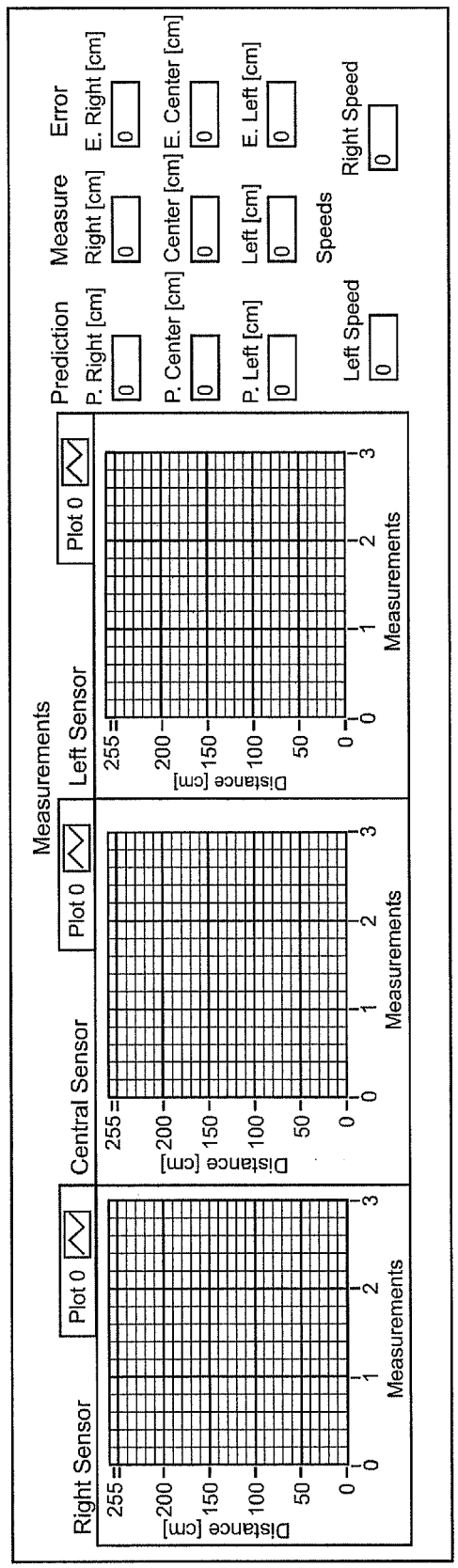
FIG. 10 illustrates the prediction section panel as implemented in LabVIEW.

FIG. 10 illustrates the prediction section panel 1000 as implemented in LabVIEW.

Figure 11:
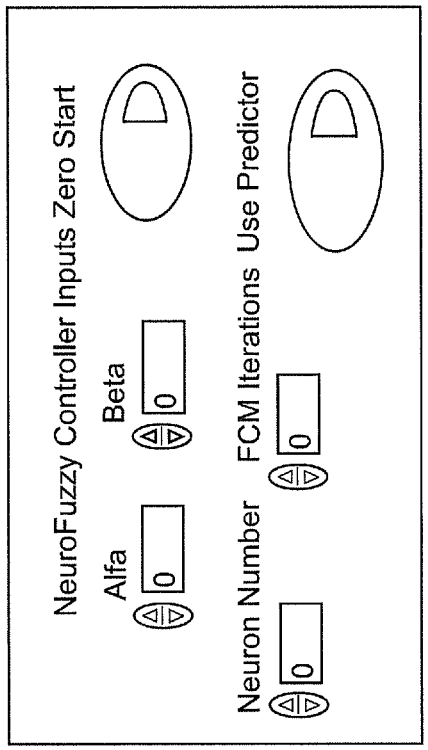
FIG. 11 illustrates the input section panel as implemented in LabVIEW.

FIG. 11 illustrates the input section panel 1100 as implemented in LabVIEW.

In FIG. 10, there are three graphics where the current measurements and their predictions are plotted according to the right, center and left sensors. They preferably are continuously changing with the next measurement and the next prediction. On the right side, we find the numerical measurements of the distance on the right, center and left side; and the output speeds computed by the system. The user may adjust the parameters of the system, including the predictors' data and the FCM (see FIG. 11). It is also possible to control the learning process with the Zero Start button. Activating this button, the system starts adjusting its membership functions for the first time; otherwise, the membership functions will be adjusted with all the information previously stored while the system is in operation.

Figure 12:
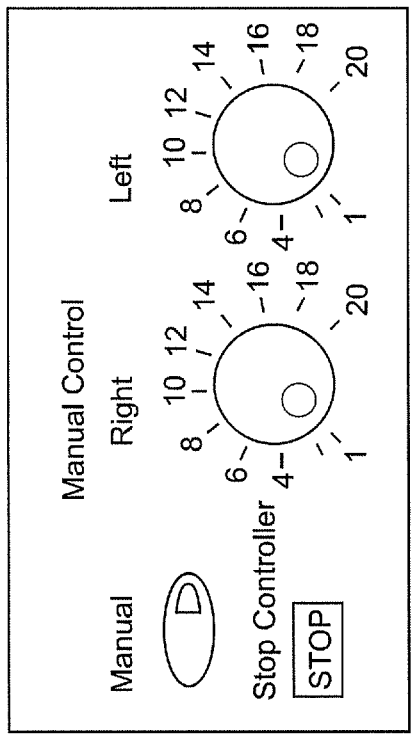
FIG. 12 illustrates the manual control panel as implemented in LabVIEW.

FIG. 12 illustrates the manual control panel 1200 as implemented in LabVIEW. The user may choose to use either manual or automatic control of the robot; this option is shown in FIG. 12. There are also two dials that control the speed and direction of each robot drive.

Figure 13:
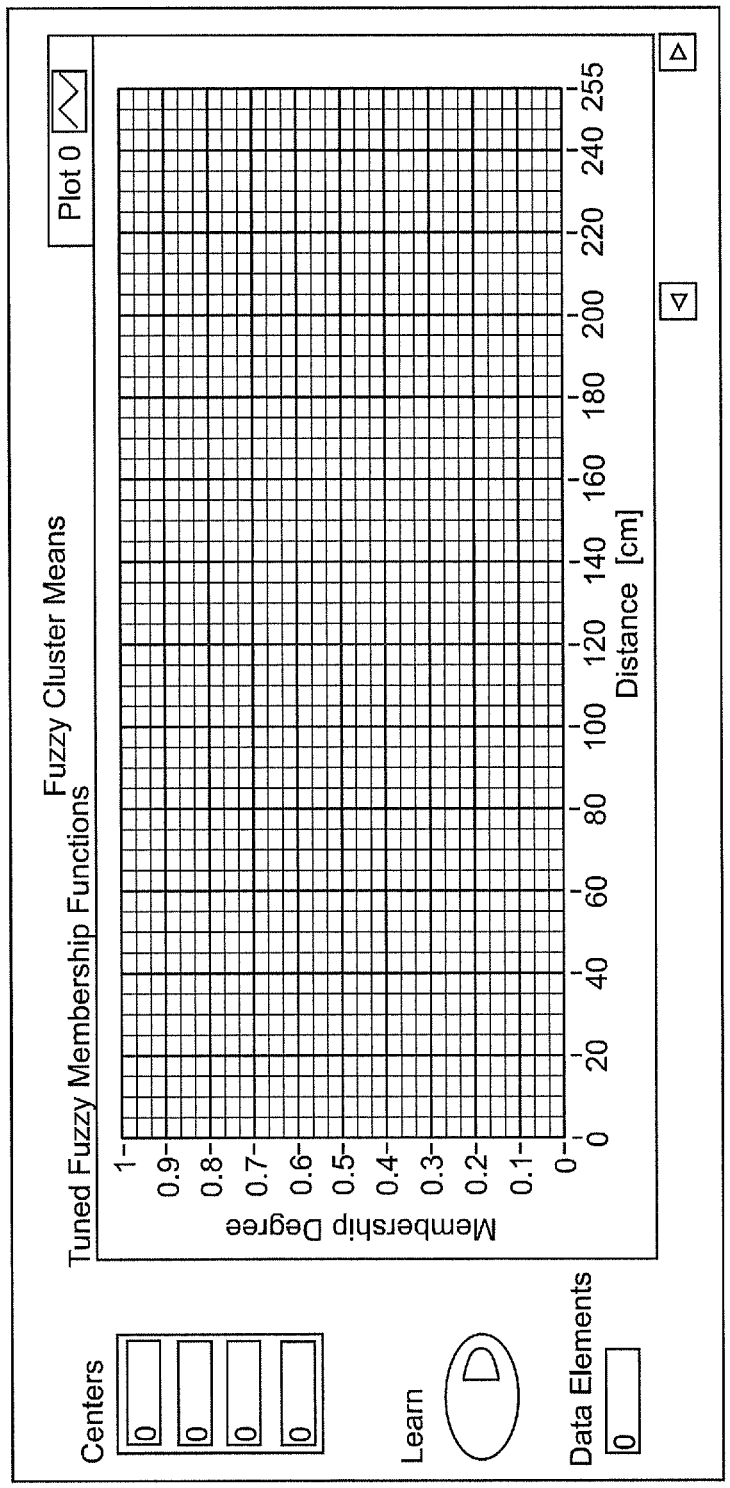
FIG. 13 illustrates the FCM section panel as implemented in LabVIEW.

FIG. 13 illustrates the FCM section panel 1300 as implemented in LabVIEW. FIG. 13 presents the display to plot the four membership functions adjusting continuously. On the left side we may see the number of the center of each cluster.

Implementation

Figure 14:
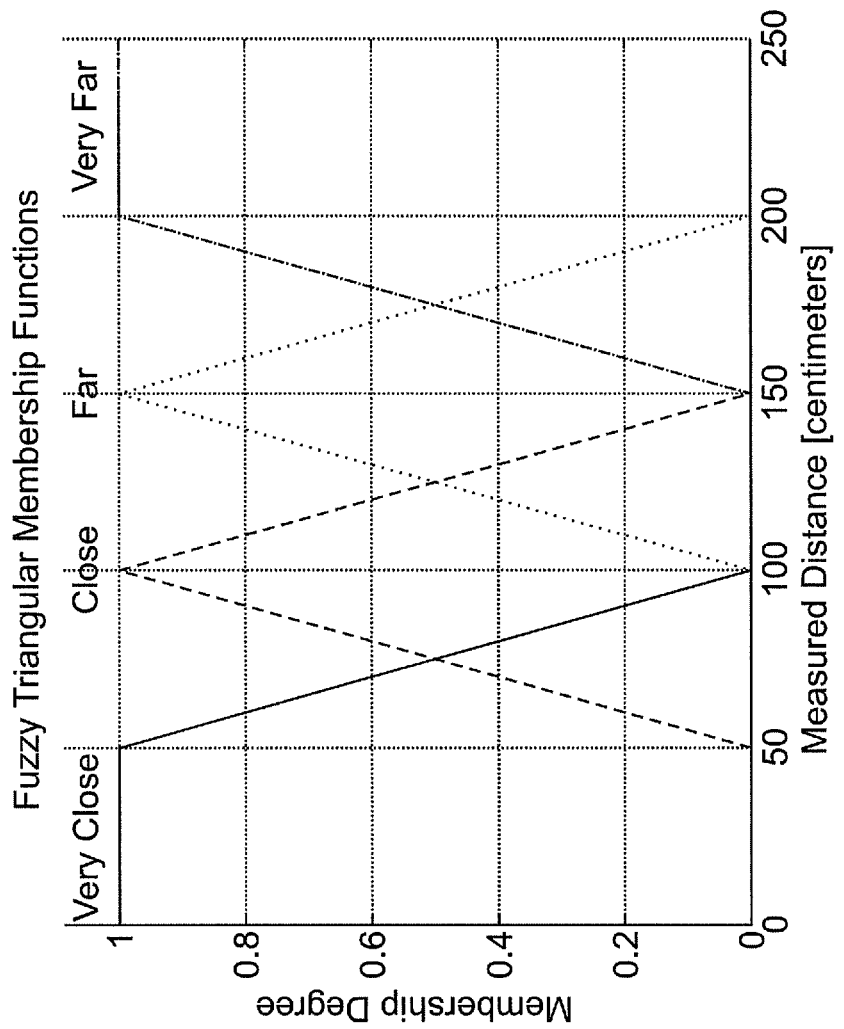
FIG. 14 illustrates the four clusters of fuzzy memberships according to a preferred embodiment of the present invention.

The three proximity sensors were set on the front side of the robot to measure left, center, and right obstacle position. Fuzzy membership functions are tuned by FCM and triangular functions were used, in order to simplify the implementation. These fuzzy memberships where fixed to four clusters FIG. 14 illustrates the four clusters of fuzzy memberships 1400 according to a preferred embodiment of the present invention. The linguistic terms associated with these functions are Very Close, Close, Far and Very Far. The system has four membership functions and three inputs, thus fuzzy rules may be calculated as $4^3=64$.

In order to obtain the performance of the robot, different speeds where tested with a fixed number of walking cycles, displaced distance and the turning degree were measured to obtain the speed functions that control the robot behavior, some of this measures are shown below in Table 2.

TABLE 2

Inference rules.

| Right Speed | Left Speed | Displacement [Centimeters] | Angle [Degrees] | Turning Direction |
|---|---|---|---|---|
| 1 | 1 | 201 | 2 | Center |
| 1 | 7 | 171 | 30 | Left |
| 9 | 1 | 186 | 35 | Right |
| 10 | 1 | 156 | 72 | Right |

With this information the output of the fuzzy rules were proposed, as shown in Table 3, different combinations for the fuzzified inputs have different combinations of speed outputs.

TABLE 3

Fuzzy rules outputs

| Left Sensor | Central Sensor | Right Sensor | Left Speed | Right Speed |
|---|---|---|---|---|
| Very Far | Very Far | Very Far | 1 | 3 |
| Far | Very Close | Close | 10 | 1 |
| Far | Very Far | Close | 9 | 1 |

A signal that represents the controller output was modeled using a trigonometric neural network with 35 neurons, and was trained with this information.

Figure 15:
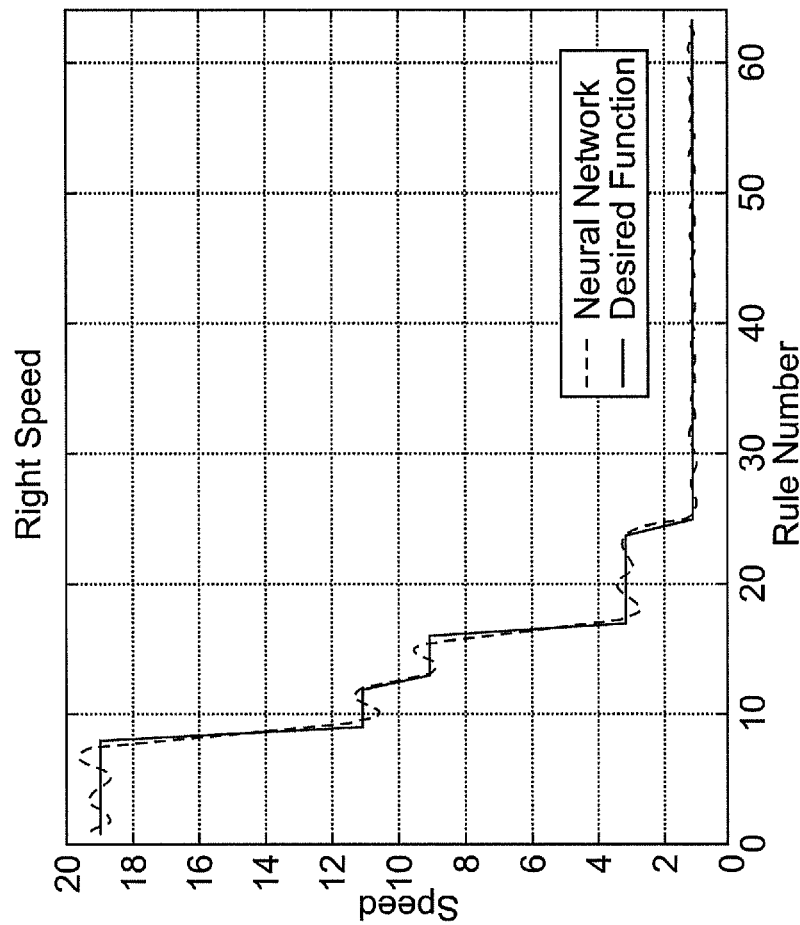
FIG. 15 shows the output of the trained network for the right controller output and compared to the original signal; the average error is less than 2%.

FIG. 15 shows the output 1500 of the trained network for the right controller output and compared to the original signal; the average error is less than 2%.

Figure 16:
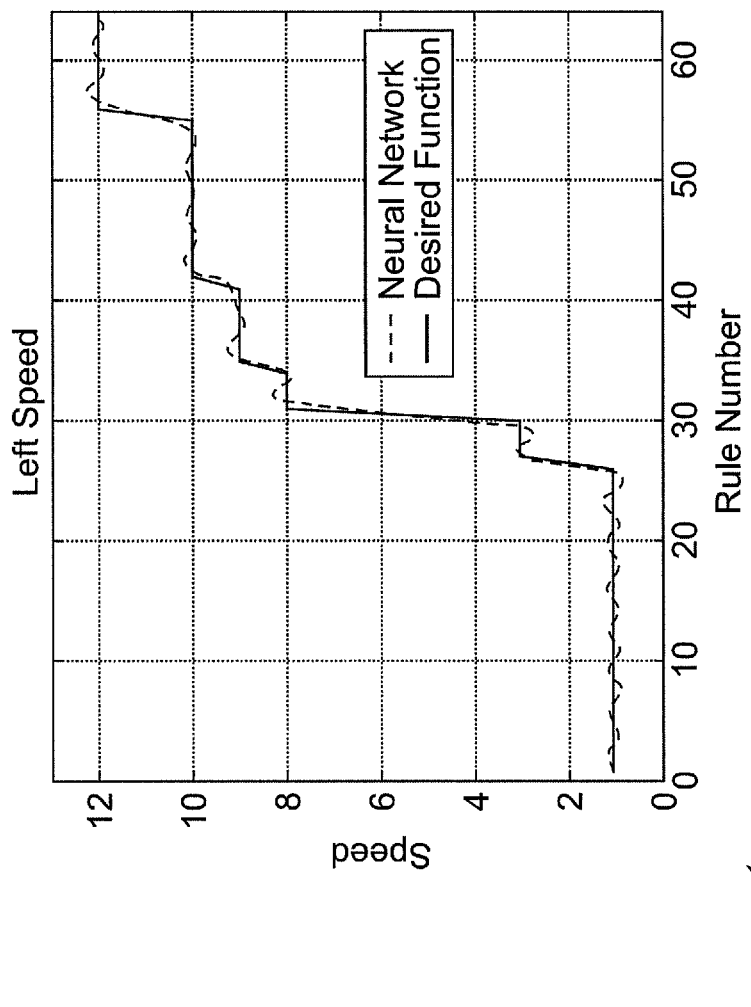
FIG. 16 shows the output of the trained network for the left controller output and compared to the original signal; the average error is less than 2%.

FIG. 16 shows the output 1600 of the trained network for the left controller output and compared to the original signal; the average error is less than 2%.

The predictive method and the FCM algorithm were implemented in the controller. Successive measurement that were made were added to a vector that was used to fix the shape of the fuzzy membership functions.

Figure 17:
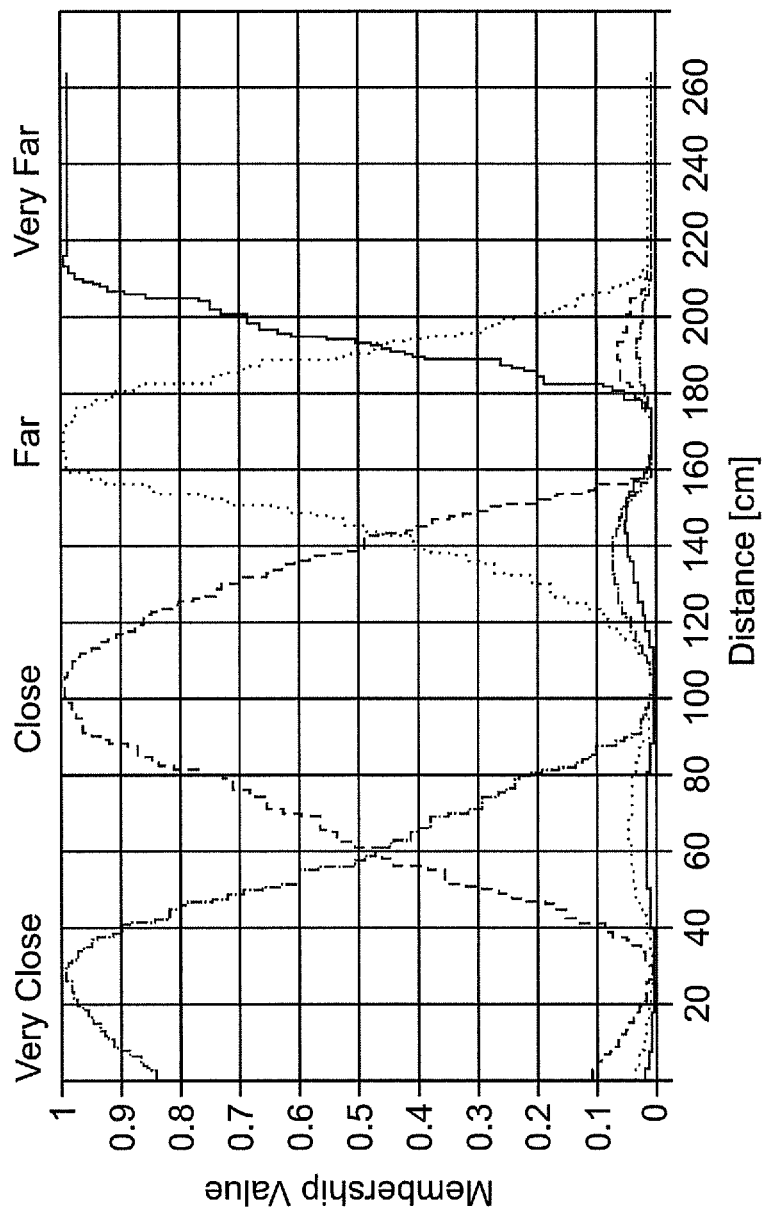
FIG. 17 illustrates a chart of the resulting shape of the fuzzy membership functions.

FIG. 17 illustrates a chart 1700 of the resulting shape of the tuned fuzzy membership functions. These functions were then adjusted by the neural trigonometric network, implemented with 15 neurons.

Figure 18:
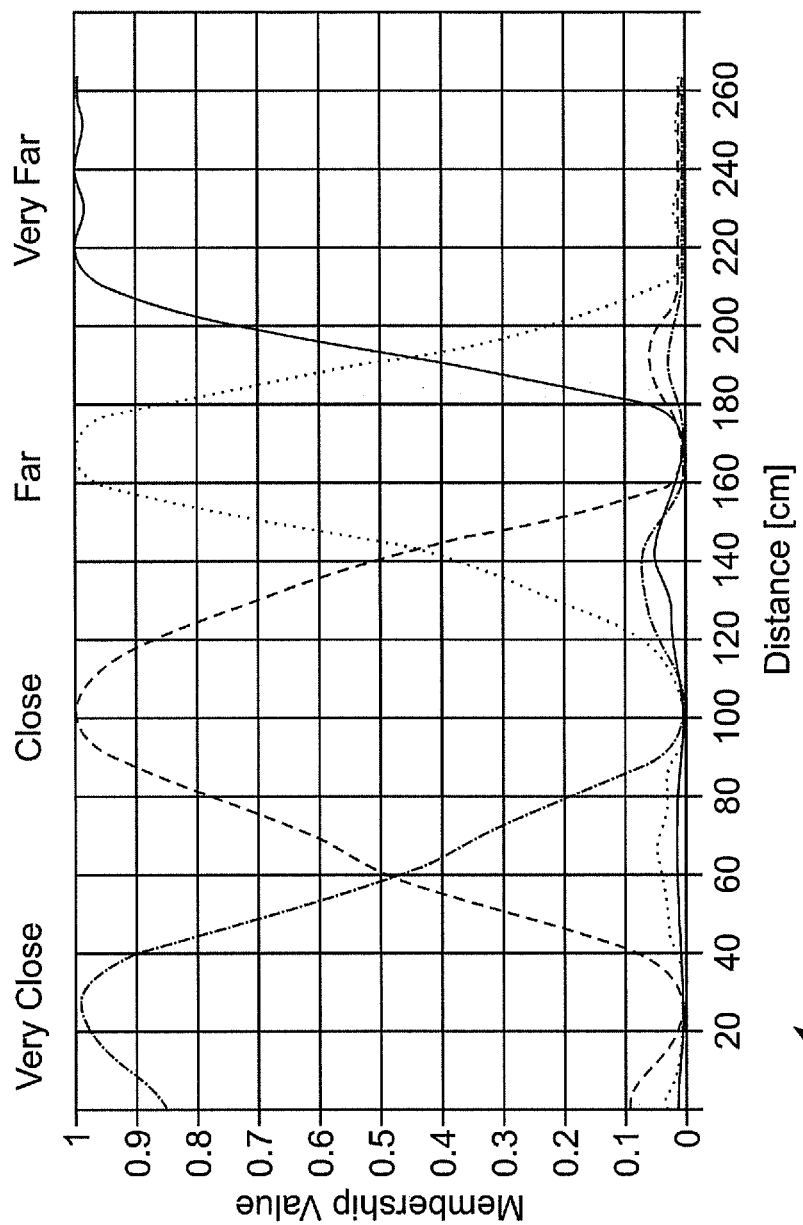
FIG. 18 illustrates a chart of the learned functions with 25 neurons.

FIG. 18 illustrates a chart 1800 of the learned functions with 25 neurons.

Figure 19:
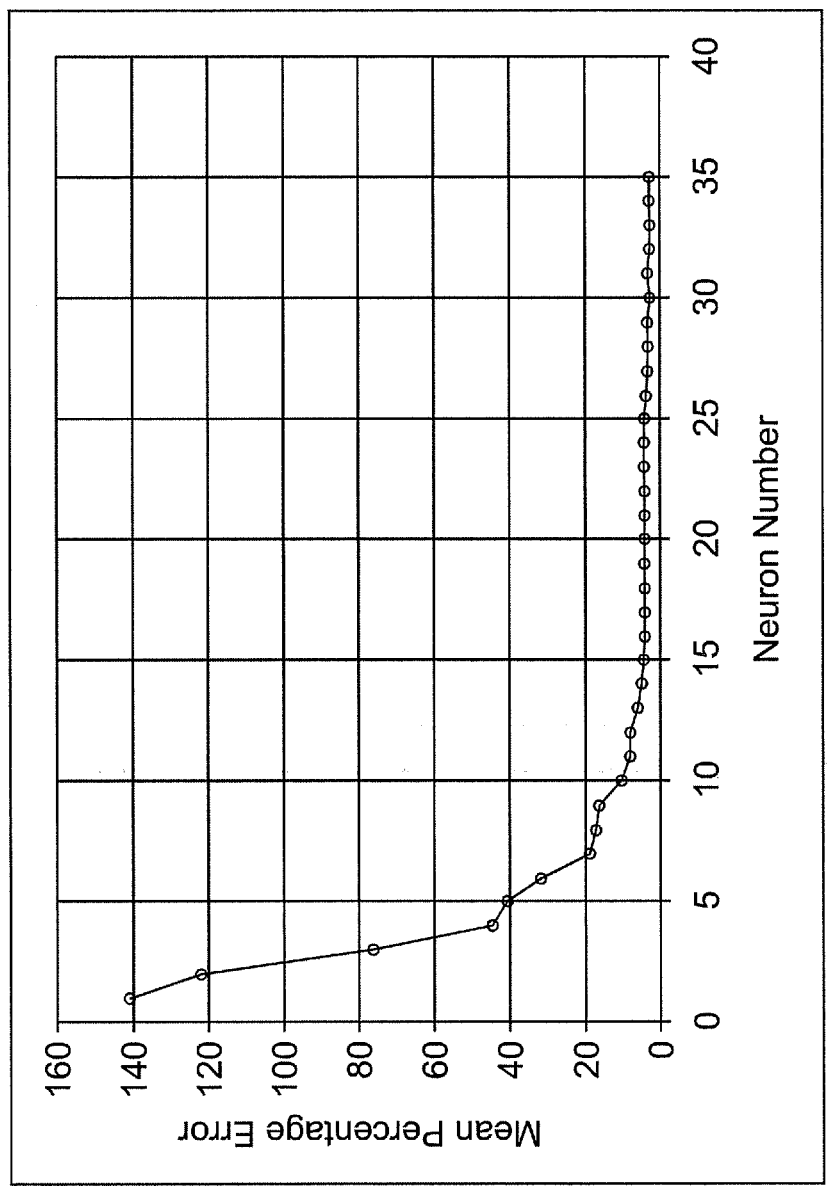
FIG. 19 illustrates a chart of the mean percentage error behavior.

FIG. 19 illustrates a chart 1900 of the mean percentage error behavior.

Results

We now compare the dynamic behavior of the navigation system using the neuro-fuzzy controller with the predictive method (NFP) and without the predictive method (NF).

When the NF was tested the results showed that the robot was able to navigate around the maze avoiding the walls but it was not be able to avoid dynamic objects which moved in a linear trajectories at constant speed around 10 Km/h.

After the training process the NFP could navigate and avoid dynamic objects. The results present a good behavior when the robot is moving in the maze It also may be observed that it takes sometime to walk straight through the maze. The movements are oscillating and tend to get closer to the walls The following tests were done with the NFP controller. The robot was set in the same environment without previous knowledge of it.

Figure 20:
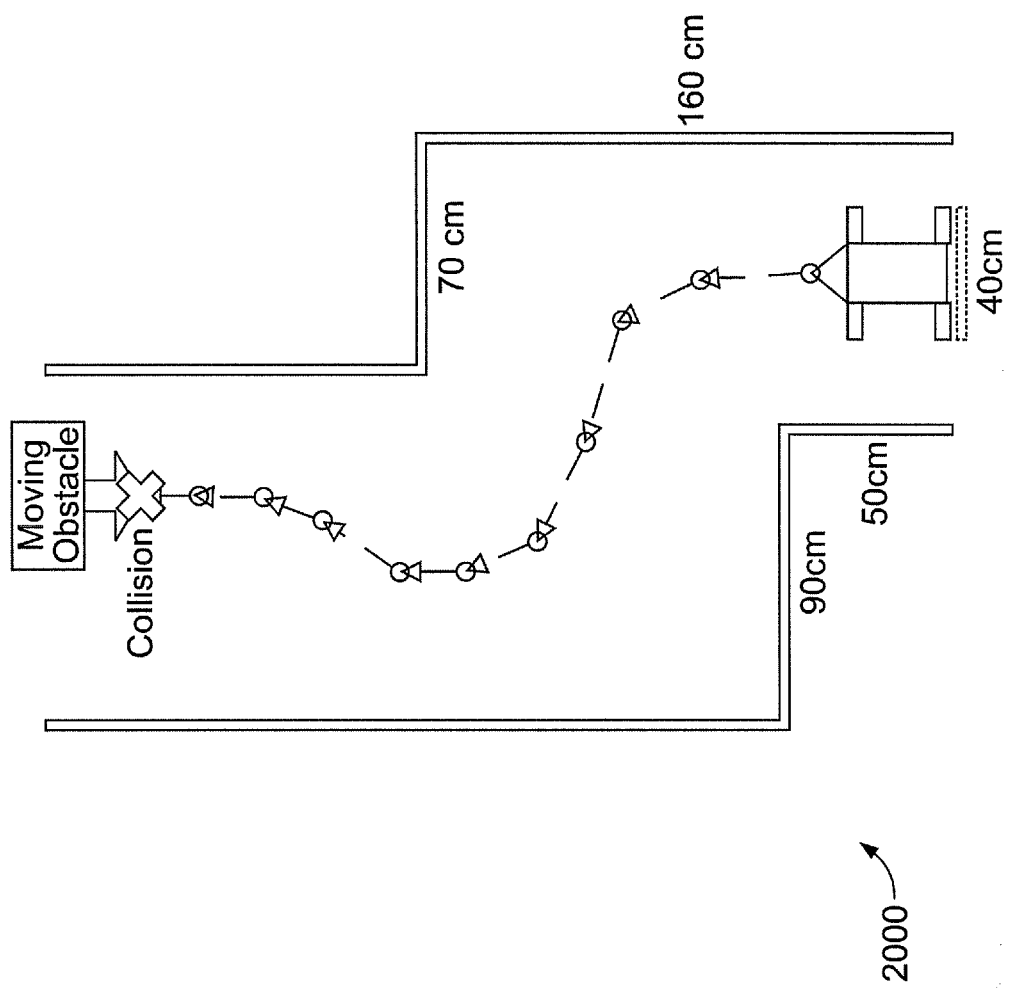
FIG. 20 illustrates the results of the robot's motion without the predictive method and the FCM.

FIG. 20 illustrates the results 2000 of the robot's motion without the predictive method and the FCM.

Figure 21:
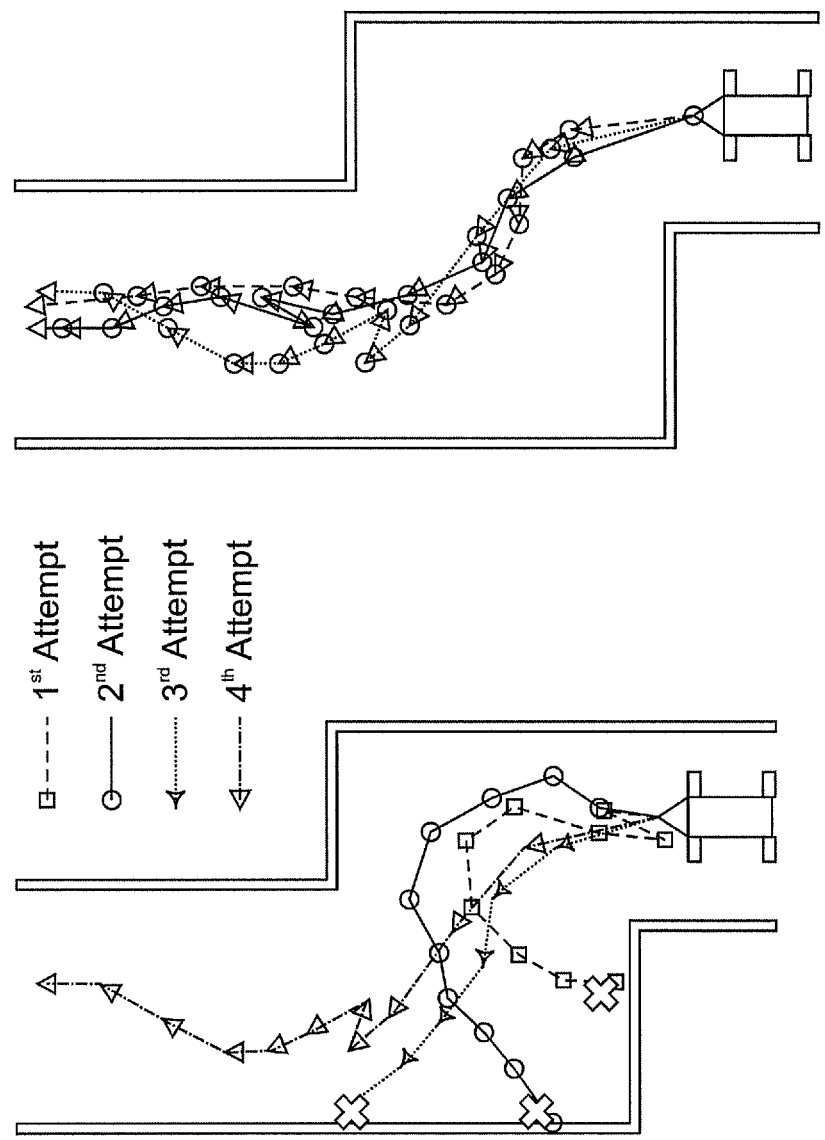
FIG. 21 illustrates the motion of the robot in a series of successive attempts to navigate the maze.
Figure 22:
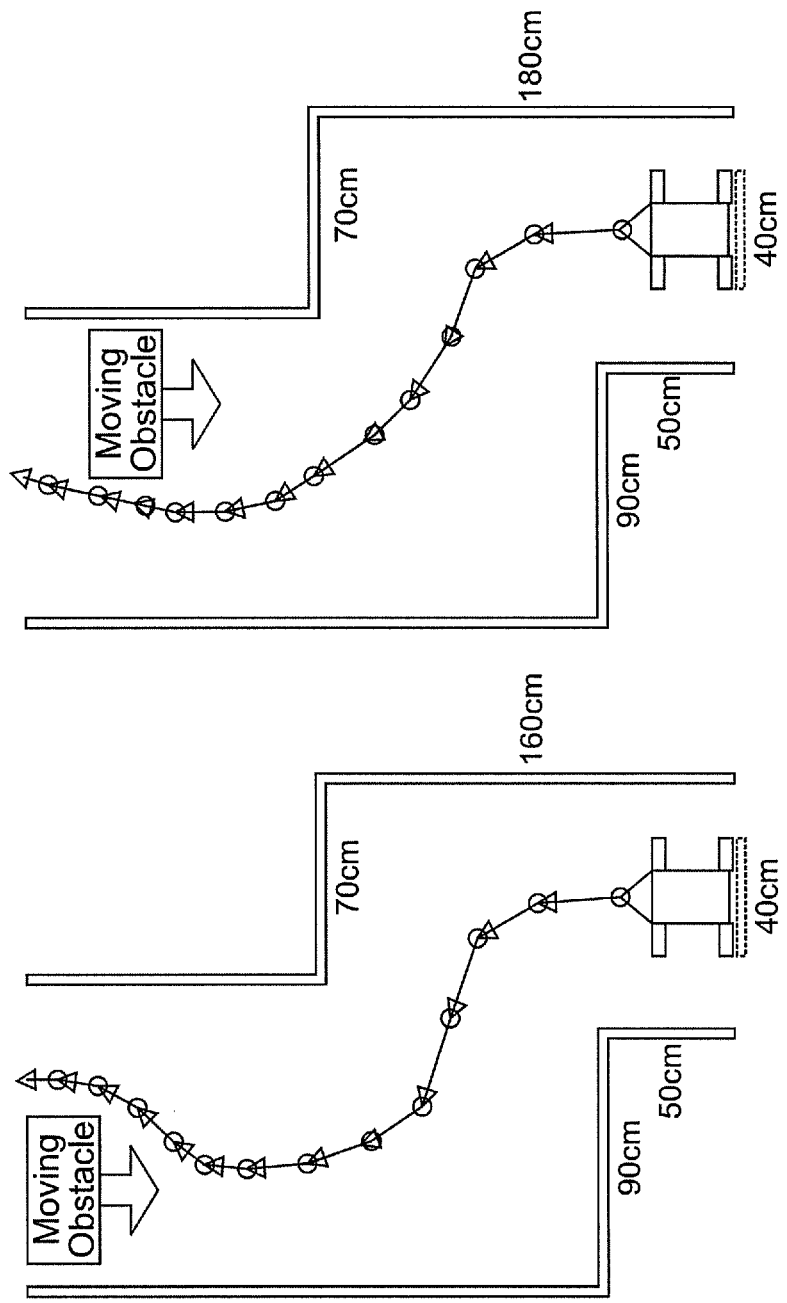
FIG. 22 illustrates some trajectories of the robot in avoiding the dynamic obstacles.

FIG. 21 illustrates the motion of the robot in a series of successive attempts to navigate the maze. It may be seen in FIG. 21 that at the beginning the robot finds it difficult to move in the environment, several attempts have to be done before it stops colliding with the walls. When it gets enough information from the environment then it is able to move around without colliding. After more attempts the performance is improved allowing the robot to maneuver through the center of the maze, without the need of moving backwards or colliding When dynamic obstacles were introduced to the environment the robot was able to avoid them. FIG. 22 illustrates some trajectories of the robot in avoiding the dynamic obstacles. As shown in the figure, once the robot detects the obstacles it begins to move away from the obstacles.

The use of the predictor method and the FCM algorithm helps to improve the performance of the system, allowing the robot to avoid dynamic objects and get a better result compared with the neuro-fuzzy controller without predictors. The system without predictors also showed good results. For implementation ease the FCM algorithm may alternatively be omitted as the use of the fixed triangular fuzzy membership functions is good.

Two predictor algorithms were compared in order to obtain the best system. After several tests with narrow and wide distances between the walls of the labyrinth, we found that the best prediction system was the exponential smoothing, followed by the Box & Jenkins. The minimum variance predictor results were unacceptable. Table 4 has the abbreviations for the graphics.

TABLE 4

Abbreviations for predictors

| BJ | Box & Jenkins |
| ES | Exponential Smoothing |
| NP | Without Predictor |

Figure 23:
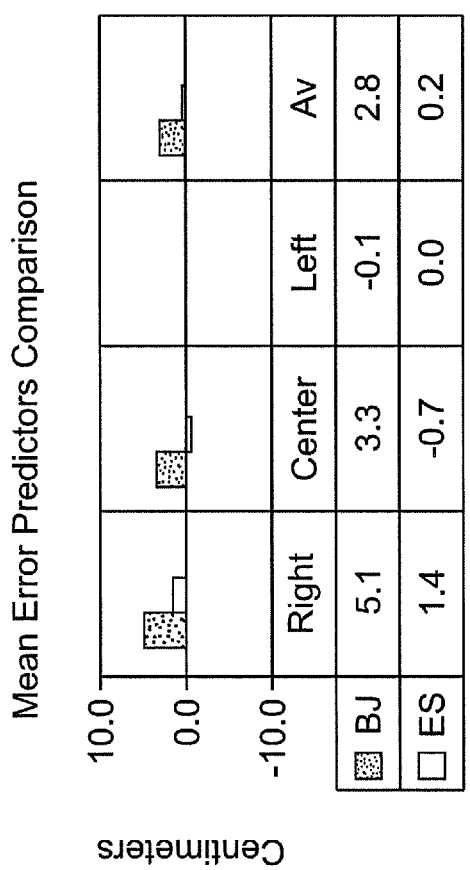
FIG. 23 shows the error difference between the prediction and the real value.
Figure 24:
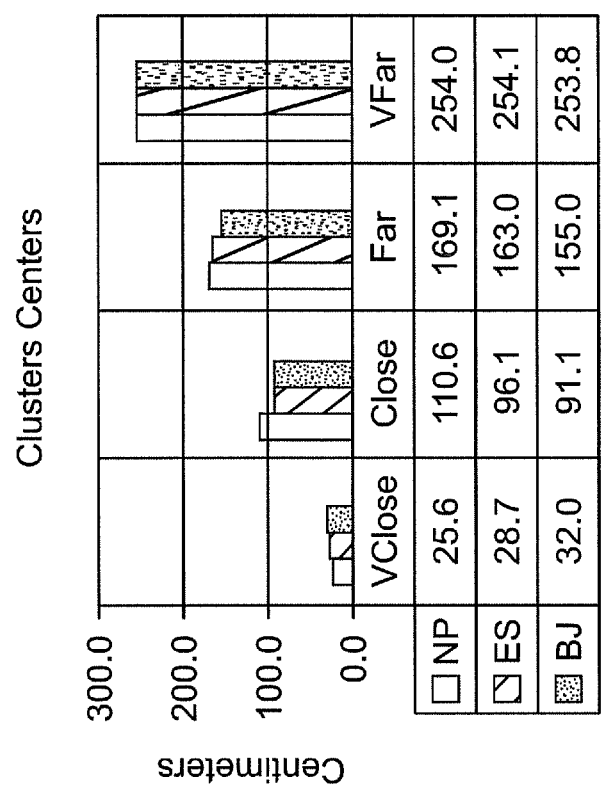
FIG. 24 shows the size of the centers.
Figure 25:
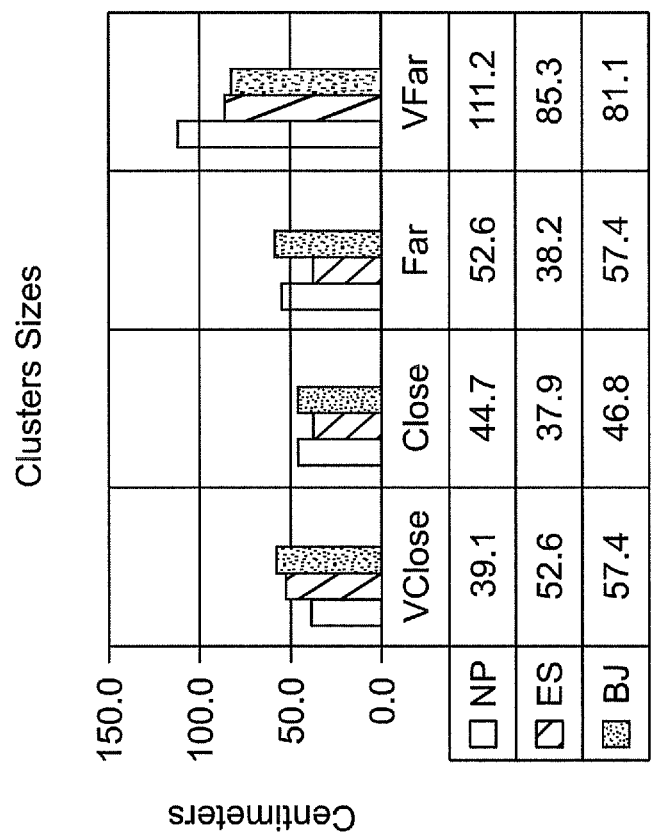
FIG. 25 shows the size of the clusters.

FIG. 23 shows the error difference between the prediction and the real value. FIG. 24 shows the size of the centers. FIG. 25 shows the size of the clusters.

Since the neuro-fuzzy controller was applied the obstacle avoidance problem was achieved in an efficient manner in unknown environments. The performance of the proposed controller was an enhanced version of a previous system adapting to the environment in which the robots are moving adjusting the system in a real time. The predictive method allows the robot anticipate its movements, obtaining a better way to avoid obstacles. The execution of the system may be done in real time platform, because of the neural networks based on trigonometrical series may be trained faster than the conventional neural networks, in addition the fuzzy systems processing time is small, the part of the controller that is off-line is to get the number of the membership functions.

Performance of the system may also be improved by implementing genetic programming for getting knowledge in a linguistic form. The one aspect of this concept is to get information from a real plant in a linguistic manner by an autonomous program. This program is able to generate a set of rules for describing a real system. The reason to describe it in a linguistic faun is because the main way of communication is using linguistic expressions, so if we implement a model based on linguistic rules, the model is understandable without a deep knowledge of mathematics or physics. This makes the model more accessible for a lot of persons that required understanding it in a clear way.

Consequently, we obtain an interface between the user and the system in linguistic form. The autonomous system preferably only requires the inputs and outputs of the system for getting a set of rules which are the minimum number of rules which describe the real plant.

For example, if a user wanted to describe an electric vehicle the system may fix a set which includes the inputs and outputs into the system, the result is a set that mapping the inputs and outputs of the real plan in the linguistic form. The system may generate new information by this mapping.

Basic Theory

In 1992 John Coza developed a variation of Genetic Algorithms that is able to automate the generation of computer programs. Evolutionary Algorithms, also known as Evolutionary Computing, are the general principles of natural evolution that can be applied to completely artificial environments. Genetic Algorithms and Genetic Programming are types of Evolutionary Computing. Genetic programming represents computing methods that give to a system the possibility to generate optimized programs or computer codes. In GP if . . . then . . . rules are coded in to individuals, which often are represented as trees.

Figure 26:
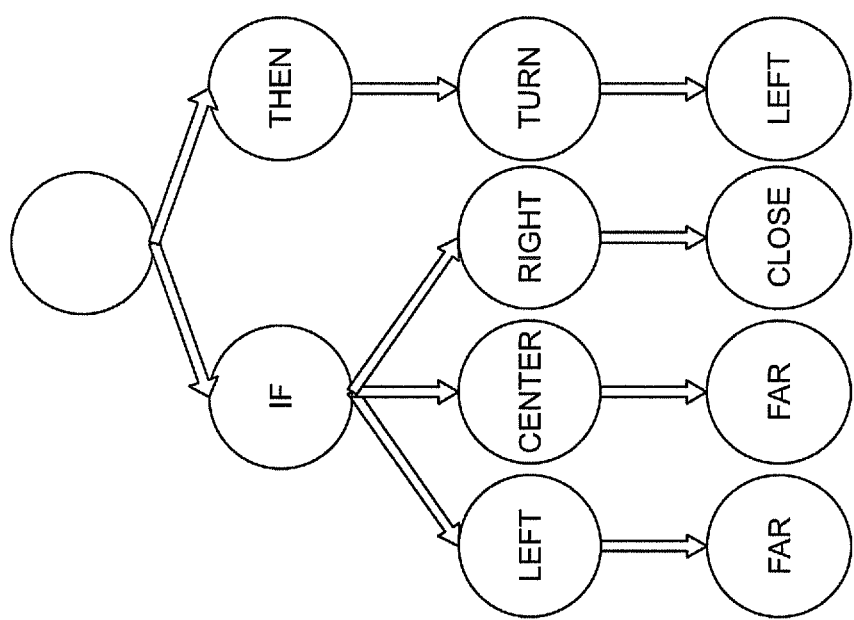
FIG. 26 illustrates this rule represented as a tree.

For example: in a wheel robot, If left is far & center if far & right is close then turn left. FIG. 26 illustrates this rule represented as a tree 2600.

Accordingly to Banzhaf (Banzhaf et al., 1998) "genetic programming, shall include systems that constitute or contain explicit references to programs (executable code) or to programming language expressions . . . ".

Length in Genetic Algorithms

In Genetic Algorithms the length of the chromosome is fixed, which can restrict the algorithm to a non optimal region of the problem in search space, because of this using tree representation, in Genetic Programming we can have chromosomes of almost any length.

Genetic Programming Stages

Genetic Programming uses four steps to solve problems:

1) Generate initial population of random compositions of the functions and terminals of the problem (computer programs).

2) Execute each program in the population and assign it a fitness value according to how well it solves the problem.

3) Create a new population of computer programs
a) Copy the best existing programs.
b) Create new programs by mutation.
c) Create new computer programs by crossover.

4) The best computer program that appeared in any generation, the best-so-far solution, is designated as the result of genetic programming.

Just like in Genetic Algorithms, in Genetic Programming the stages are initialization, selection, crossover and mutation.

Initialization

There are two methods for creating the initial population in a GP system:

1) Full: selects nodes from only the function set until a node is at a specified maximum depth.

2) Grow: randomly selects nodes from the function and terminal set which are added to a new individual.

Selection

The most used method for selecting individuals in GP is tournament selection, because it does not require a centralized fitness comparison between all individuals. The best individuals of the generation are selected.

Crossover

In a random position two trees interchange their branches, but it should be in a way such that syntactic correctness is maintained. Each offspring individual will pass to the selection process of the next generation.

Figure 27:
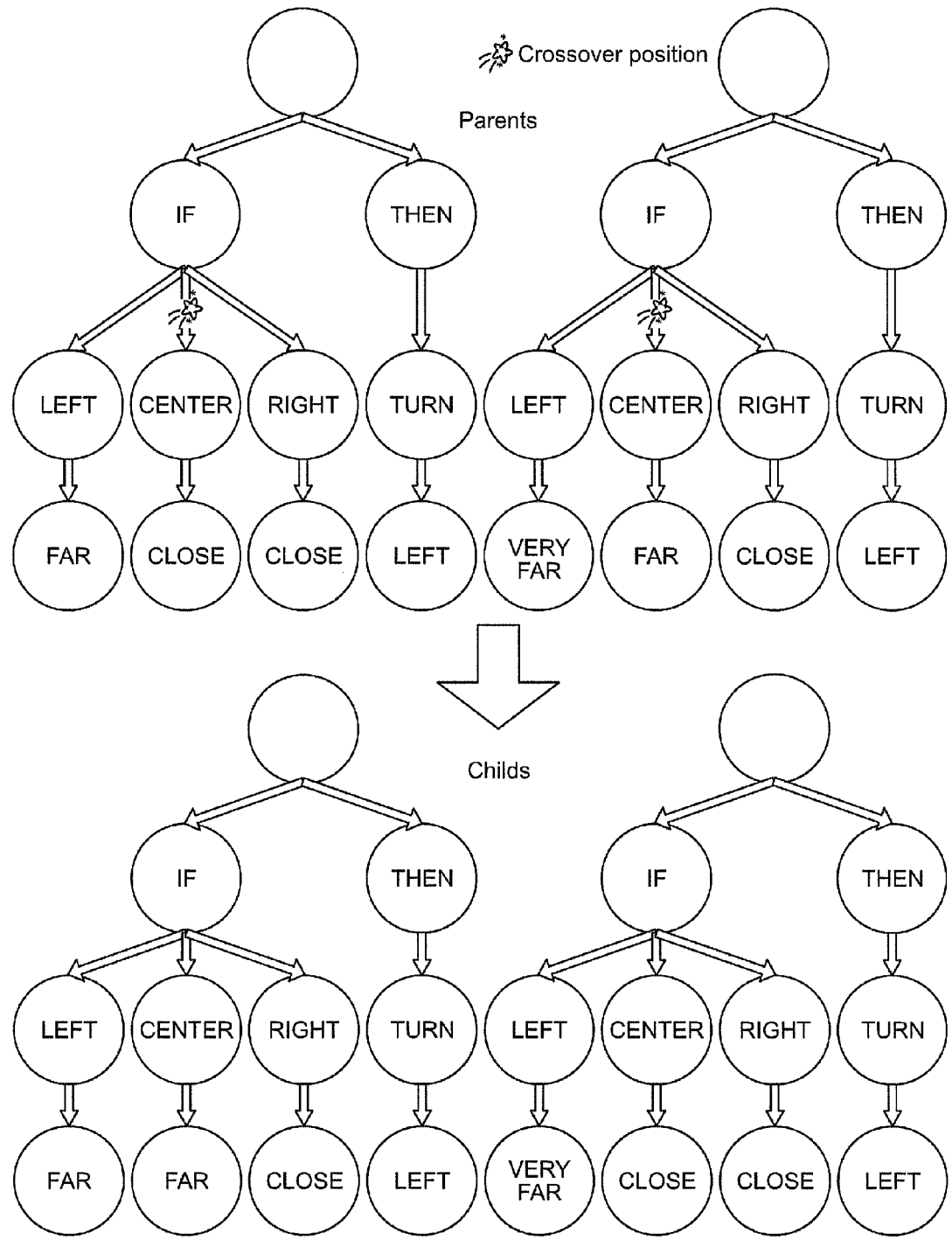
FIG. 27 illustrates a representation of a crossover according to a preferred embodiment of the present invention.

FIG. 27 illustrates a representation of a crossover according to a preferred embodiment of the present invention. This may provide the system with an unexpected advantage and may allow the crossover to succeed and be selected.

Mutation

In Genetic Programming the generated individuals are selected with a very low probability to be mutated. When an individual is mutated, one of its nodes is selected randomly and then the current sub tree at that point is replaced with a new randomly generated sub tree.

It is important to state that just like in biological mutation, in GP mutation the genotype may not change but also the resulting genotype could be completely different.

Figure 28:
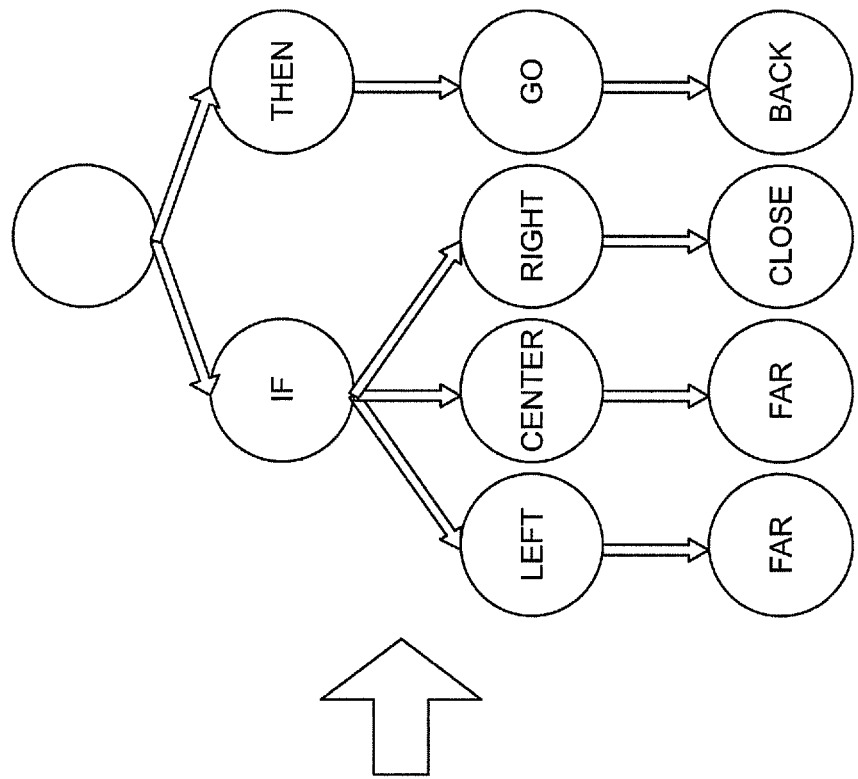
FIG. 28 illustrates a representation of a mutation according to a preferred embodiment of the present invention.
Figure 28:
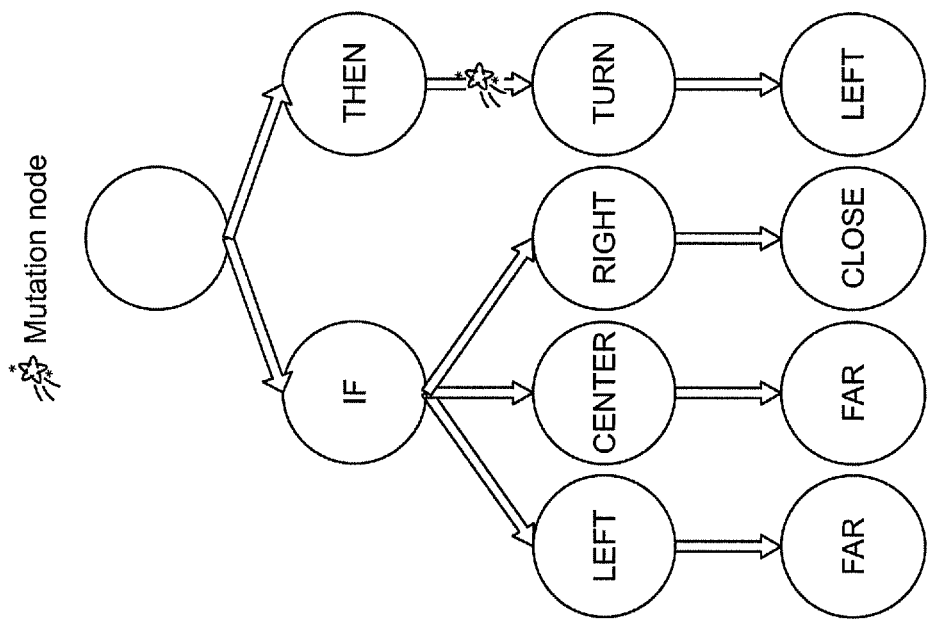

FIG. 28 illustrates a representation of a mutation according to a preferred embodiment of the present invention. As shown in FIG. 28, the "turn left" action has been mutated to become "go back." This may provide the system with an unexpected advantage and may allow the new mutation to succeed and be selected.

Thus, a preferred embodiment of the present invention includes a general neuro-fuzzy controller which may be used in different applications such as Robotics, Automobile, etc. The controller was designed and validated by LabVIEW but it may be programmed in any programming languages like C code, Pascal, or Fortran, for example. Additionally, the controller may be adjusted for controlling any kind of system.

Some of the advantages of this controller are:

It does not require an expert for tuning the membership functions as conventional fuzzy logic does.

The predictor systems help the controller to improve the performance.

The neural networks only need one epoch for training then may be implemented. This allows to used them on line.

Neural networks are used in the fuzzification and defuzzification process.

The neuro-fuzzy controller is a general controller which may be applied in different plants.

The whole controller is autonomous because only requires information from the input and output for working properly.

The controller adapts online taking samples from the system.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A neuro-fuzzy controller including:
a predictor system on a computer, said predictor system performing prediction to generate predicted input, and providing the predicted input into a fuzzy cluster module;
a fuzzy cluster module on a computer, wherein said fuzzy cluster module fuzzifies said predicted input using a first neural network to form a fuzzified input before providing said fuzzified input to an inference engine,
wherein the output of said inference engine is defuzzified using a second neural network to determine an output,
wherein the number of membership functions used by said neuro-fuzzy controller is calculated using participation coefficients,
wherein at least one of said first neural network and said second neural network employs a trigonometrical series,
wherein said inference engine employs a rules set that is determined using genetic programming.

2. The neuro-fuzzy controller of claim 1 wherein at least one of said first neural network and said second neural network only require one epoch for training.

3. The neuro-fuzzy controller of claim 1 wherein said predictor employs exponential smoothing.

4. The neuro-fuzzy controller of claim 1 wherein said genetic programming includes at least one crossover between two branches of at least one tree representing a rule.

5. The neuro-fuzzy controller of claim 1 wherein said genetic programming includes at least one mutation in at least one branch of a tree representation of a rule.

* * * * *